US010585494B1

(12) United States Patent
Porcella et al.

(10) Patent No.: US 10,585,494 B1
(45) Date of Patent: Mar. 10, 2020

(54) AUXILIARY TEXT DISPLAY INTEGRATED INTO A KEYBOARD DEVICE

(71) Applicant: Apple Inc., Cupertino, CA (US)

(72) Inventors: John A. Porcella, Cupertino, CA (US); Kyle J. Nekimken, Cupertino, CA (US)

(73) Assignee: APPLE INC., Cupertino, CA (US)

(*) Notice: Subject to any disclaimer, the term of this patent is extended or adjusted under 35 U.S.C. 154(b) by 248 days.

(21) Appl. No.: 15/232,012

(22) Filed: Aug. 9, 2016

Related U.S. Application Data

(60) Provisional application No. 62/321,272, filed on Apr. 12, 2016.

(51) Int. Cl.
G06F 3/02 (2006.01)
G06F 1/16 (2006.01)
G06F 3/01 (2006.01)
G06F 17/27 (2006.01)

(52) U.S. Cl.
CPC .............. *G06F 3/021* (2013.01); *G06F 1/165* (2013.01); *G06F 1/1616* (2013.01); *G06F 1/1643* (2013.01); *G06F 3/016* (2013.01); *G06F 17/276* (2013.01); *G06F 2203/04105* (2013.01)

(58) Field of Classification Search
CPC ........ G06F 3/021; G06F 17/276; G06F 3/016; G06F 2203/04105; G06F 1/165; G06F 1/1616; G06F 1/1643
See application file for complete search history.

(56) References Cited

U.S. PATENT DOCUMENTS

| 7,884,804 B2 | 2/2011 | Kong | |
|---|---|---|---|
| 2006/0017699 A1 | 1/2006 | Brown | |
| 2006/0034043 A1* | 2/2006 | Hisano | G06F 1/1616 361/679.04 |
| 2006/0052885 A1* | 3/2006 | Kong | G06F 1/1626 700/84 |
| 2011/0201387 A1* | 8/2011 | Paek | G06F 3/0237 455/566 |
| 2011/0260976 A1 | 10/2011 | Larsen et al. | |
| 2012/0194448 A1* | 8/2012 | Rothkopf | A45C 13/002 345/173 |
| 2013/0050090 A1 | 2/2013 | Stewart et al. | |
| 2013/0050222 A1 | 2/2013 | Moran et al. | |
| 2013/0162515 A1* | 6/2013 | Prociw | G06F 1/1616 345/156 |
| 2017/0075381 A1* | 3/2017 | Koo | G06F 1/1662 |

FOREIGN PATENT DOCUMENTS

WO    WO/2015/147519    *    3/2015

* cited by examiner

*Primary Examiner* — Aneeta Yodichkas
(74) *Attorney, Agent, or Firm* — Dorsey & Whitney LLP

(57) ABSTRACT

A device with an enhanced keyboard is disclosed. One embodiment may take the form of a laptop computer with an auxiliary display embedded within a lower portion of the computer. A further embodiment of the auxiliary display renders contextual information based on information on a main computer display and inputs received from an input device such as a set of keys, mouse, or trackpad.

21 Claims, 17 Drawing Sheets

US 10,585,494 B1

AUXILIARY TEXT DISPLAY INTEGRATED INTO A KEYBOARD DEVICE

CROSS-REFERENCE TO RELATED APPLICATION

This application is a nonprovisional patent application of U.S. Patent Application No. 62/321,272, filed Apr. 12, 2016 and titled "Auxiliary Text Display Integrated Into A Keyboard Device," the disclosure of which is hereby incorporated herein by reference in its entirety.

FIELD

The described embodiments relate generally to devices for computing and, more particularly, to a device with an enhanced keyboard having an auxiliary display.

BACKGROUND

Since the advent of the personal computer, an ever increasing number of people use computers for both professional and home purposes. Users may be somewhat limited in their productivity while operating a computer, particularly when entering data through a keyboard. However, few advances have been made in recent years to improve typing efficiency for users operating desktop and laptop computers. Therefore, an improved keyboard design is needed in order to increase efficiency and improve the user experience when typing on desktop and laptop computers.

SUMMARY

In general, embodiments of the present disclosure are directed to a device having a keyboard with an integrated auxiliary display. One embodiment may take the form of an electronic computing device having an enclosure with an upper portion and a lower portion pivotally coupled to the upper portion. The device also includes a processing unit positioned within the enclosure, a main display positioned within the upper portion and operably coupled to the processing unit, a set of keys positioned at least partially within the lower portion, and an auxiliary display positioned within the lower portion and operably coupled to the processing unit. The processing unit is configured to cause a first set of information to be displayed on the main display and to cause a second set of information to be displayed on the auxiliary display. The second set of information comprises a subset of the first set of information.

Another embodiment may take the form of a method for rendering contextual information on an auxiliary display. The method includes the steps of rendering primary visual information on a main display, rendering secondary visual information on the auxiliary display positioned within a keyboard and operably coupled to the main display, and receiving input from an input device. In response to the input from the input device, the method updates the primary visual information and the secondary visual information to include additional information associated with the input.

Still another embodiment may take the form of an electronic computing device having an upper portion, a lower portion, and a processing unit. The upper portion has an enclosure and a main display positioned at least partially within the enclosure. The lower portion includes an upper surface, a set of keys positioned within the upper surface, and an auxiliary display. The processing unit is configured to receive inputs from the set of keys. Based on the inputs from the set of keys, the processing unit causes primary visual information to be rendered on the main display and causes secondary visual information to be rendered on the auxiliary display.

While multiple embodiments are disclosed, still other embodiments of the present invention will become apparent to those skilled in the art from the following detailed description. As will be realized, the embodiments are capable of modifications in various aspects, all without departing from the spirit and scope of the embodiments. Accordingly, the drawings and detailed description are to be regarded as illustrative in nature and not restrictive.

BRIEF DESCRIPTION OF THE DRAWINGS

The disclosure will be readily understood by the following detailed description in conjunction with the accompanying drawings, wherein like reference numerals designate like structural elements.

Figure 1:
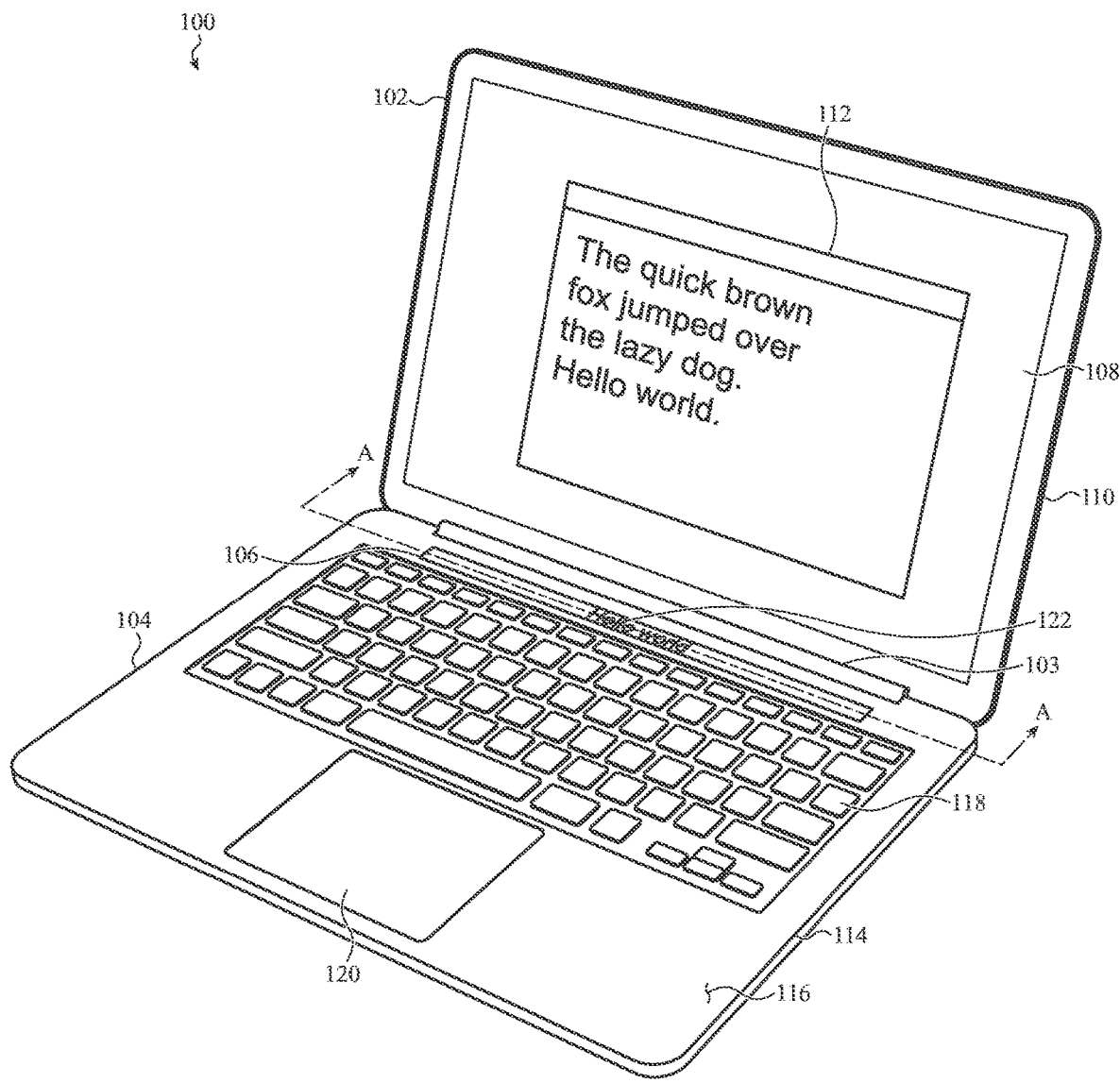
FIG. 1 depicts a device with an auxiliary display positioned on a lower portion of the device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims.

The following disclosure relates to a device, which may be an electronic computing device, having an auxiliary display located within the keyboard that can be used to enhance user productivity. In a typical computer system, when a user is typing on a keyboard, it is difficult for the user to maintain visual focus on both the keys being typed and the main display rendering the typed characters. To view both the keys being pressed and the results of the typing presented on the display, a user may be forced to repeatedly shift his or her field of view between the keyboard and the main display or monitor. This continual shifting may slow down or interrupt typing activity, which may limit or reduce the user's productivity and/or the efficiency of typing operations.

Embodiments described herein may help improve typing efficiency by allowing the user to focus on the auxiliary display within the keyboard during typing operations. In some embodiments described herein, the auxiliary display and the main display (e.g., computer monitor) are incorporated within a device having a processing unit that is configured to coordinate information rendered on both displays. In particular, the processing unit may be configured to coordinate information on the auxiliary display, including recent keyboard input and selected contextual information, with related information displayed on the main display or monitor, including the recent keyboard input within a richer or more comprehensive user interface. The information presented on the auxiliary display may be sufficiently detailed to allow the user to focus on typing operations without shifting his or her field of view away from the keyboard.

By coordinating content rendered on the auxiliary display with an application or user interface content being rendered on the main display, an enhanced user experience and/or typing efficiency may be achieved. For example, during a typing operation, the auxiliary display may render a series of characters corresponding to the most recently typed keys. The same characters may also be rendered on the main display in accordance with a word-processing or text editing application. In some instances, the auxiliary display may also render additional content to enhance the typing experience including, for example, suggested words or phrases to complete a word or sentence being typed. By displaying both a stream of recently typed characters and suggested words or spelling corrections within the user's field of view, typing speed and typing accuracy may be improved.

In some embodiments, the auxiliary display may present additional content or context to the user by rendering simplified or extracted portions of a user interface (e.g., a graphical user interface) being simultaneously rendered on the main display. The simplified or extracted portions may correspond to an area of interest within the user interface and/or a portion of an active software application being rendered on the main display. In some cases, the auxiliary display renders a scaled version of at least a portion of the user interface rendered on the main display, thus mimicking selected information on the main display. Displaying simplified or extracted information on an auxiliary display may allow the user to continue typing without having to shift his or her field of view away from the keyboard.

In some embodiments, the auxiliary display includes a touch sensor that may be configured to detect the presence and/or location of an object on the auxiliary display and to define a touch-sensitive surface. An auxiliary display having a touch-sensitive surface may further expand the functionality of the system by allowing users to interact with the information on the auxiliary display. For example, the touch-sensitive surface may allow a user to select a suggested word or phrase rendered on the auxiliary display. This may facilitate rapid execution of selected actions without diverting attention away from the keyboard, which may further improve the user's typing efficiency and/or productivity.

In some embodiments, the auxiliary display includes a force sensor that is configured to detect or measure an amount of force applied to the surface of the auxiliary display. A force-sensitive auxiliary display (also referred to generally as a touch-sensitive display) may provide additional user-selection functionality. For example, a user may use a light touch to select a word and an increased or heavier touch to access another series of options (e.g., optional actions) associated with the word selection. The additional options might include additional suggested words or phrases based on the selected word. The additional options may include one or more actions, such as, replace, delete, cut, or launching a web search or calendar entry.

In embodiments with a touch and/or force sensor, the auxiliary display may also include a haptic element. The haptic element may include a device or mechanism that produces a haptic output or haptic feedback to a user interacting with the auxiliary display. The haptic element may include a motor, actuator, or other mechanism that is configured to produce a vibration, a tap, or other haptic output. In some cases, the haptic element may provide a haptic output in response to a user interacting with the auxiliary display. In one example, the auxiliary display produces a haptic output in response to a user's selection of an item displayed on the auxiliary display. In some cases, the haptic output is coupled or coordinated with an audio output produced using a speaker or other acoustic element of the device.

Because the auxiliary display is located on the keyboard near the user's hands, the auxiliary display may be adapted to detect when a user's finger or other object visually obstructs a portion of the auxiliary display. In response to the detection of an obstruction, the auxiliary display may be configured to adapt the arrangement of the information displayed to reduce or avoid the detected obstruction. This may allow the auxiliary display to adapt to a particular user's normal hand placement or movement of the user's hands while still presenting useful information to the user as he or she types.

These and other embodiments are discussed below with reference to FIGS. 1-13. However, those skilled in the art will readily appreciate that the detailed description given herein with respect to these Figures is for explanatory purposes only and should not be construed as limiting.

FIG. 1 depicts an example electronic computing device 100 having an auxiliary display 106. In the example of FIG.

1, the device 100 includes an upper portion 102, a lower portion (e.g., a keyboard) 104, and an auxiliary display 106 on the lower portion 104. The device 100 also includes a main display 108, which is located within the upper portion 102. The location of the auxiliary display 106 on the lower portion 104 may place it within the field of view of a user while typing, which may provide several advantages described above. While FIG. 1 is described with respect to a particular portable electronic device (e.g., a notebook computing device), aspects of the device 100 may also apply to a variety of devices including, for example, a computer system, electronic computing device, laptop computing device, desktop computing device, and other similar devices.

The device 100 may be configured to coordinate information presented between the main display 108 and the auxiliary display 106. For example, a processing unit (e.g., 1170 in FIG. 11) may be configured to receive inputs from a set of keys 118 and cause the display of coordinated visual information on both the main display 108 and the auxiliary display 106. The device 100 having an auxiliary display 106 may provide an enhanced or improved typing experience by providing visual information on the auxiliary display 106 that is coordinated with the information on the main display 108, which may provide context and feedback relevant to the user's typing activity. In some cases, the auxiliary display 106 may present a series of recently typed characters, along with typing suggestions and other contextual information without requiring the user to shift focus to the main display 108.

As shown in FIG. 1, the device 100 includes a lower portion 104 having a set of keys 118, which may generally be referred to as a keyboard. The lower portion 104 or keyboard includes an auxiliary display 106 integrated into one or more surfaces of the lower portion 104. In this particular example, the auxiliary display 106 is positioned along an upper surface 116 of the lower portion 104. Other example placements of the auxiliary display 106 are provided in FIGS. 3A-C, discussed in more detail below.

As shown in the example of FIG. 1, the auxiliary display 106 may present secondary visual information 122 (e.g., a set of information) that is coordinated with or related to the primary visual information 112 rendered on the main display 108. The secondary visual information 122 may include contextual information to assist a user while typing. Contextual information may be information which may be helpful or relevant to a user while typing or otherwise engaging in operations in which the field of view of the user is focused on the lower portion 104. The contextual information, including a series or set of recently typed characters or words, may help a user confirm the accuracy of typing without having to shift his or her focus from the lower portion 104.

The secondary visual information 122 on the auxiliary display 106 may be derived from or representative of primary visual information 112 on the main display 108. For example, the main display 108 may render a first set of information included in the primary visual information 112 that includes both graphical elements (e.g., a window with a border having a background color) and text elements (e.g., the text "The quick brown fox jumped over the lazy dog. Hello World."). The auxiliary display 106 may include secondary visual information 122 that includes a second set of information that is a subset of the first set of information. Specifically, the second set of information may include the text element "Hello World," which is a subset of the text elements of the first set of information "The quick brown fox jumped over the lazy dog. Hello World." displayed on the main display 108. The second set of information may also include one or more graphical elements of the first set of information including, for example, a portion of the window, border, color, or other graphical aspect of the primary visual information 112.

In some cases, the secondary visual information 122 includes a set of graphical and/or textual information that is a visually scaled or simplified version of the primary visual information 112. For example, the secondary visual information 122 may include similar graphical and/or textual elements of the primary visual information 112, but at a reduced scale and/or a reduced detail. Additionally or alternatively, the secondary visual information 122 may include a series of characters representing inputs recently received from the set of keys 118. Additional examples of the coordination between primary visual information (having a first set of information) and secondary visual information (having a second set of information) are described in more detail below with respect to FIGS. 5 and 8-10C.

The auxiliary display 106 may be implemented using a variety of electronic display technologies. The auxiliary display 106 may include, for example, a liquid crystal display (LCD), organic light-emitting diode (OLED) display, organic electroluminescence (OEL) display, or another electronic display element. The auxiliary display 106 may further include a cover sheet configured to protect the display element from physical damage. The auxiliary display 106 is electrically and/or operably coupled to other components of the device 100 including a processing unit, as described in more detail below with respect to FIG. 11.

In order to further enhance user interactions with the auxiliary display 106, the auxiliary display 106 may further define or incorporate a touch-sensitive surface. The touch-sensitive surface may include one or more touch sensors (shown in FIGS. 2 and 11) that are configured to detect the presence and location of a touch on the surface of the auxiliary display 106. The touch sensitive surface may, for example, allow a user to select one of several options presented in the secondary visual information 122 by touching a corresponding portion of the surface of the auxiliary display 106. Example functionality is provided below with respect to FIGS. 7A-C.

The auxiliary display 106 may further define or incorporate a force-sensitive surface, using one or more force sensors (shown in FIGS. 2 and 11) to detect and/or measure an amount of force applied to the surface of the auxiliary display 106. The force-sensitive surface may allow the device 100 to present and/or execute additional actions using the auxiliary display 106. Other sensors may also be included in the auxiliary display 106 including, for example, an infrared sensor, ultrasonic sensor, or acoustic sensor.

The auxiliary display 106 may further define or incorporate a haptic feedback surface, using one or more haptic elements (shown in FIG. 11) to provide haptic feedback to a user. In some cases, the auxiliary display may produce a haptic output in response to a detected touch or force applied to the surface of the auxiliary display 106, or it may be initiated without touch or force inputs. The haptic feedback surface may provide tactile response to a user typing or interacting with the auxiliary display in addition to the visual response of the auxiliary display 106.

As shown in FIG. 1, the lower portion 104 includes an enclosure 114 having an upper surface 116. The enclosure 114 may be configured to enclose and protect various electronic components and subsystems positioned within the lower portion 104. In particular, the enclosure 114 may at least partially enclose and protect the auxiliary display 106 and the set of keys 118. The enclosure 114 may be formed from a variety of material including, for example, a molded plastic, steel, aluminum, glass, acrylic, composite, carbon fiber, or the like. The enclosure 114 may also include a textile, synthetic leather cover, or other similar material. The enclosure 114 may be formed from multiple components and/or formed from a combination of multiple, different materials. One or more ports may be positioned within the enclosure 114, whether on the upper surface 116 or elsewhere within the enclosure 114. Example ports may be configured to electrically connect the device 100 with another external device and may conform to a specific standard including a USB, VGA, DisplayPort, HDMI, microphone, speaker, mouse, Ethernet, memory card reader, or other type of electronic coupling. The enclosure 114 may also include one or more power ports positioned along an external surface of the enclosure 114 and configured to receive electrical power from an external power source, such as a wall outlet or power supply.

As shown in FIG. 1, the device 100 includes a set of keys 118 positioned along the upper surface 116 of the lower portion 104. The set of keys 118 may include electromechanical or electronic actuators that are configured to produce an output in response to touch or press input from a user. The output from the set of keys 118 may represent, at least in part, alphanumeric characters, which may be communicated to the processing unit or other aspects of the device 100. A subset of the set of keys 118 may enable the performance of various functions performed by the device 100. Each key of the set of keys 118 may have one or more unique symbols indicating a function and/or a character that it represents. The symbols may be painted, printed, molded, etched, or otherwise visibly placed on the surface of the keys 118. The set of keys 118 may be positioned within separate openings within the upper surface 116 of the lower portion 104 as shown in FIG. 1, or one or more of the keys 118 may be positioned within an opening within the upper surface 116.

As shown in FIG. 1, the device 100 may include a touch-sensitive region, which may include a trackpad 120 positioned along the upper surface 116 of the lower portion 104. The trackpad 120 may be positioned below the set of keys 118 and generally aligned with a centerline of the lower portion 104. The trackpad 120 may include a surface having a texture and/or color that is similar to the upper surface 116. The trackpad 120 may include one or more touch sensors that are configured to detect the location of a finger or other object touching the surface of the trackpad 120. The trackpad 120 may further comprise one or more force sensors which can detect and measure an amount of force applied to the trackpad 120. The touch and force sensors may be electrically coupled to the processing unit, and may be configured to input information to the processing unit.

The example of FIG. 1 depicts the auxiliary display 106 positioned above the set of keys 118 in the lower portion 104. However, the position of the auxiliary display 106 is not limited to this location. The auxiliary display 106 may also be positioned elsewhere within the lower portion 104, including to the side or below the set of keys 118, between the set of keys 118, on the surface of one or more keys of the set of keys 118, or on the surface of the trackpad 120. Various example placements of an auxiliary display are provided in FIGS. 3A-C, described below.

As shown in FIG. 1, the lower portion 104 is pivotally coupled to the upper portion 102 of the device 100. The lower portion 104 and upper portion 102 may be pivotally coupled in such a way as to allow the two portions to rotate between a range of positions relative to each other. The positions may include an open position that is adapted for typing and otherwise operating the device 100, and a closed position that is adapted to protect the auxiliary display 106, main display 108, and other components during storage and/or transportation. The lower portion 104 and upper portion 102 may be pivotally coupled, for example, by a mechanical hinge 103 or other type of pivot. Alternatively, the upper portion 102 and lower portion 104 may be non-pivotally coupled and/or they may be separably coupled.

The upper portion 102 includes an enclosure 110. The enclosure 110 may be configured to at least partially enclose and protect the main display 108 and other components of the device 100. The enclosure 110 may be formed from a variety of materials including, for example, molded plastic, steel, aluminum, glass, acrylic, composite, carbon fiber, or the like. The enclosure 110 may alternatively or additionally comprise or cover a rigid frame or structural core formed from a rigid material. A camera, a light, or other device may be positioned within the enclosure 110 and electrically coupled to other components of the device 100 (e.g., a processing unit).

A main display 108 is positioned at least partially within the enclosure 110 of the upper portion 102. The main display 108 may be configured to render primary visual information 112 consistent with the embodiments described herein. The main display 108 may be implemented with any suitable technology, including but not limited to liquid crystal display (LCD) technology, organic light-emitting diode (OLED) technology, organic electroluminescence (OEL) technology, or similar display technology. The main display 108 may be electrically and/or operatively coupled to other components of the device 100, including the processing unit.

The upper portion 102 may further comprise one or more sensors. These sensors may include one or more infrared sensors, as well as one or more sensors which can detect the presence and position of a touch and/or the force of a touch on the main display 108. The device 100 may also include one or more sensors that are configured to detect one or more aspects of user activity including, for example, optical sensors for detecting the position or movement of a user's eyes and/or the presence of a user's face.

Figure 2:
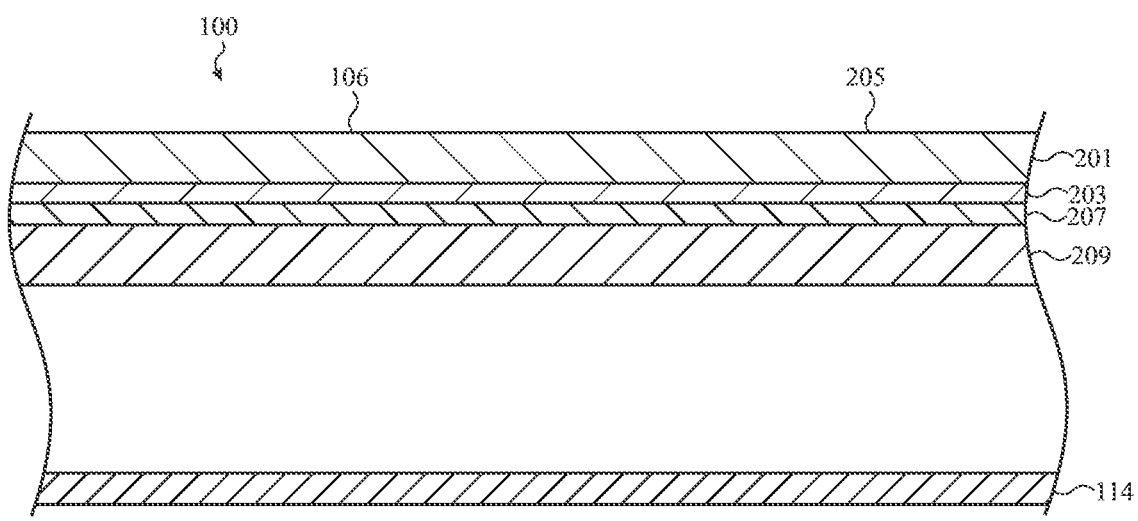
FIG. 2 depicts a partial cross-sectional view of the auxiliary display along section A-A of FIG. 1.
Figure 11:
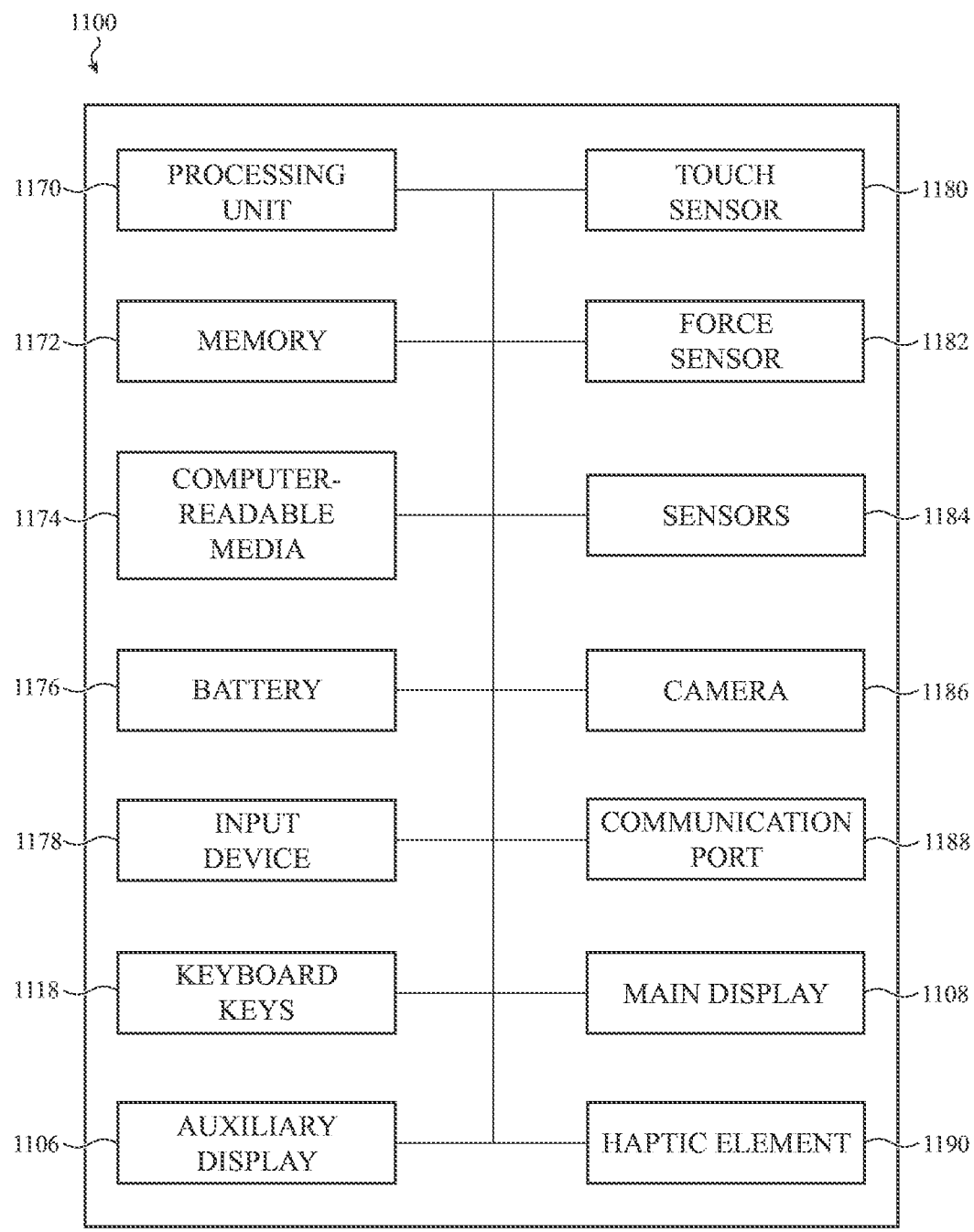
FIG. 11 depicts an example system diagram of a device with an auxiliary display.

As described above, the auxiliary display 106 may include one or more sensors that are configured to detect the location of an object and/or an applied force on a touch-sensitive surface formed over the auxiliary display 106. FIG. 2 depicts a cross-sectional view of the device 100 of FIG. 1 viewed along section A-A and illustrates the various components that may be used to form a touch-sensitive auxiliary display 106. Many internal components, such as a processing unit, computer memory, battery, and other components of the device 100 are omitted from FIG. 2 for clarity. FIG. 11, described below, provides another non-limiting example of internal components of a device which may be included in the device 100 of FIGS. 1 and 2.

As shown in FIG. 2, the auxiliary display 106 includes a cover sheet 201 that forms at least a portion of the external or exterior surface of the auxiliary display 106. The cover sheet 201 may be attached directly to the enclosure 114 or may be attached via a gasket, seal, or other coupling component. As discussed above, the cover sheet 201 (or cover) may be formed from a sheet of translucent or transparent material (e.g., polyethylene terephthalate (PET), amorphous glass, or crystalline ceramic, such as sapphire or zirconia).

In the example of FIG. 2, a touch sensor 203 is positioned below the cover sheet 201. The touch sensor 203 may include an array of capacitive electrodes that is configured to detect the location of a touch on the touch-sensitive surface 205 of the auxiliary display 106. The touch sensor 203 may operate in accordance with a mutually-capacitive, self-capacitive, or other type of capacitive sensing scheme. In some embodiments, the touch sensor 203 may include a resistive, inductive, ultrasonic, or other type of sensor configured to detect the presence and location of a touch on the touch-sensitive surface 205.

As shown in FIG. 2, a force sensor 207 is also positioned below the cover sheet 201. While in this example the force sensor 207 is depicted as being disposed below the touch sensor 203, the order and position of the layers may vary depending on the implementation. The touch sensor 203 and/or force sensor 207 may in some embodiments be positioned below the display element 209. The force sensor 207 may operate in accordance with various force-sensing schemes or configurations. For purposes of illustration, the force sensor 207 is depicted as a single layer within the display stack. However, the force sensor 207 may include multiple layers positioned in various locations within the display stack. Additionally or alternatively, the force sensor 207 may be formed around the periphery or around a region of the display element 209. The force sensor 207 may also be integrally formed with a seal or gasket that is positioned between the cover sheet 201 and the enclosure 114.

In one embodiment, the force sensor 207 is formed from one or more strain-sensitive layers that are configured to produce an electrical output or exhibit a change in an electrical property in accordance with an amount of strain or deflection of the cover sheet 201. For example, the force sensor 207 may include a piezo-electric or piezo-resistive material that produces a charge or exhibits a change in resistance in response to a deflection of the cover sheet 201. The amount of force of a touch on the touch-sensitive surface 205 may correspond to the amount of deflection of the cover sheet 201 and/or the force sensor 207.

In another embodiment, the force sensor 207 may include a capacitive sensor that includes a pair of capacitive electrodes positioned on opposite sides of a compressible layer or air gap. An amount of force may be detected by measuring deflection of the compressible layer or air gap using a change in capacitance between the pair of capacitive electrodes. The capacitive sensor may be positioned within a single layer, as depicted in FIG. 2. Additionally or alternatively, a capacitive force sensor 207 may be positioned along one or more edges of the display element 209 or may be located between the cover sheet 201 and the enclosure 114.

As shown in FIG. 2, the display element 209 is also positioned below the cover sheet 201 and may be at least partially positioned within the opening defined by the enclosure 114. As discussed above, the display element 209 may include any one of a variety of display elements including, for example, a liquid crystal display (LCD), organic light emitting diode (OLED) display, organic electroluminescent (OEL) display, and so on. While depicted as separate and distinct components in the example of FIG. 2, in some embodiments, one or more of the force sensor 207 and/or the touch sensor 203 may be integrally formed with the display element 209.

The force sensor 207 may be configured to generate an electrical output that may be used to initiate a force-event signal or press-event signal. The force- or press-event signal may be interpreted as user input (or force touch) to interact with the secondary information rendered on the auxiliary display 106 and control various aspects of the device 100. The output from the force sensor 207 may be used alone or in conjunction with the output of the touch sensor 203 to interpret a wide variety of user input on the touch-sensitive surface 205.

Figure 3A:
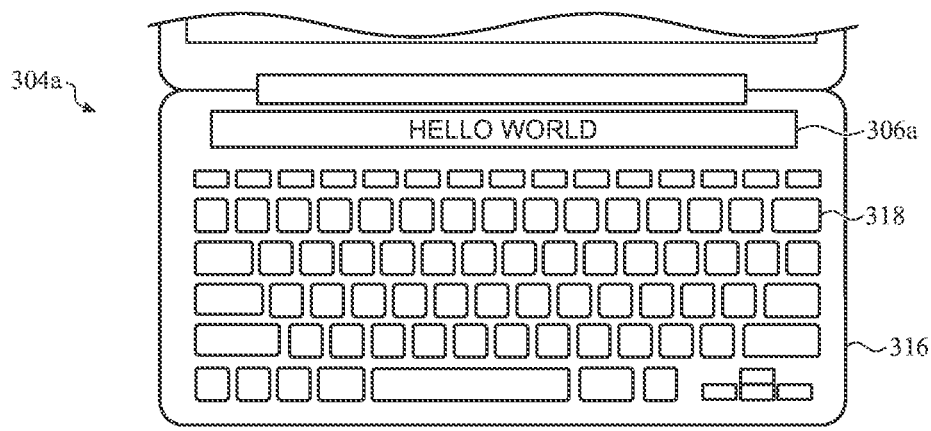
FIG. 3A depicts an example placement of the auxiliary display above a set of keys on the lower portion.
Figure 3B:
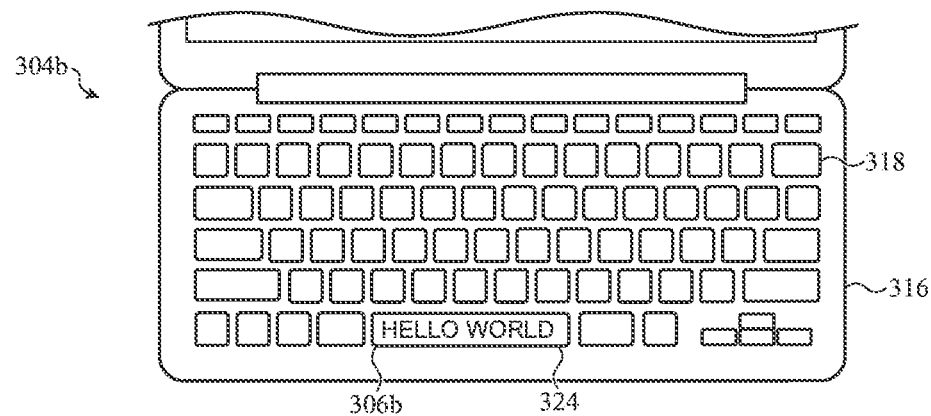
FIG. 3B depicts another example placement of the auxiliary display in the space bar on the lower portion.
Figure 3C:
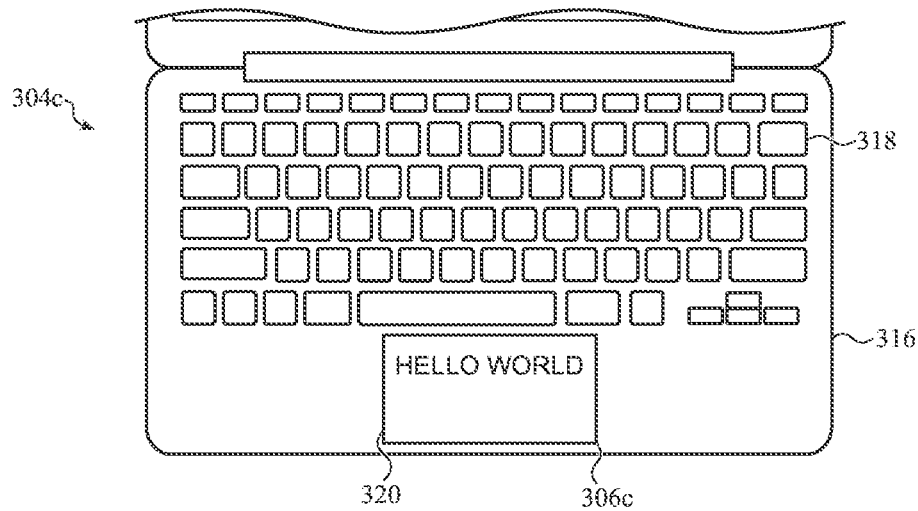
FIG. 3C depicts another example placement of the auxiliary display in the trackpad on the lower portion.

Turning to implementations of the auxiliary display 306a, 306b, 306c, FIGS. 3A-C illustrate example locations for the auxiliary display 306a, 306b, 306c within the upper surface 316 of the lower portion 304a, 304b, 304c. The auxiliary display 306a, 306b, 306c is positioned along the upper surface 316 of the lower portion 304a, 304b, 304c such that it may be within the same field of view as the set of keys 318 while a user is typing. FIGS. 3A-C show example locations above the set of keys 318, along one or more keys of the set of keys 318, and along the trackpad 320, respectively. While these are provided as specific illustrated examples, there are many other locations, such as between the set of keys 318, to the side of the set of keys 318, or anywhere within the lower portion 304a, 304b, 304c which would also be within the present disclosure. These examples are intended to illustrate potential locations, rather than limit the auxiliary display 306a, 306b, 306c to the embodiments in FIGS. 3A-C.

FIG. 3A illustrates an example location of the auxiliary display 306a within the lower portion 304a. In this example, a set of keys 318 is positioned along the upper surface 316 of the lower portion 304a. The auxiliary display 306a is positioned along a peripheral region of the lower portion 304a adjacent to a top row of the set of keys 318. With the auxiliary display 306a in this location it is in close proximity to the set of keys 318, and may allow for a wide viewing pane to render a large amount of secondary visual information.

In the example of FIG. 3B, the auxiliary display 306b is located even closer to the set of keys 318 by being positioned along the surface of a space bar 324. The auxiliary display 306b could alternatively be placed on another of the set of keys 318, or even on multiple keys of the set of keys 318. As a result, the auxiliary display 306b is not only more central to a hypothetical field of view of a user while typing, but may also allow for a more compact lower portion 304b.

FIG. 3C illustrates another example location of the auxiliary display 306c within the lower portion 304c. The auxiliary display 306c is positioned along the surface of a trackpad 320. By integrating the auxiliary display 306c with the surface of the trackpad 320, a touch-sensitive auxiliary display 306c may reduce the quantity of touch or force sensors in the device by using one set of touch or force sensors for both the trackpad 320 and the auxiliary display 306c. Placing the auxiliary display 306c along the surface of the trackpad 320 may also allow for a taller viewing pane as compared to other embodiments.

Figure 4A:
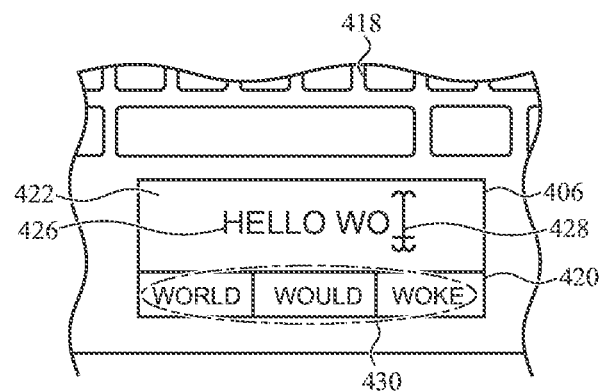
FIGS. 4A-C depict example functionality of the auxiliary display.
Figure 4B:
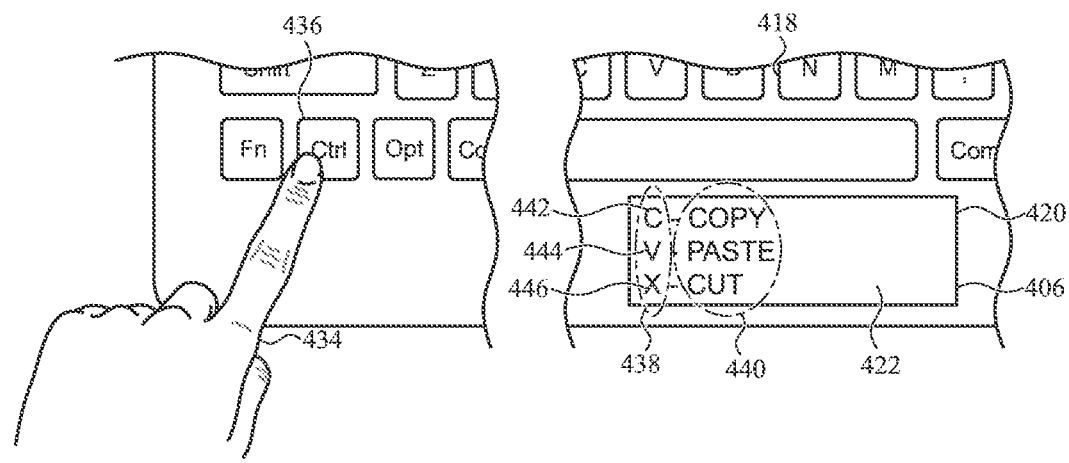
Figure 4C:
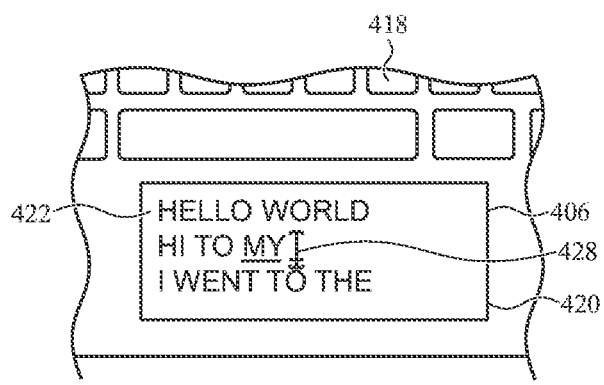

FIGS. 4A-C demonstrate several examples of secondary visual information 422 which may be rendered by the auxiliary display 406. As discussed above with respect to FIG. 1, the secondary visual information 422 may include a set of information that may be coordinated with or relate to information displayed on a main or primary display. The secondary visual information 422 rendered by the auxiliary display 406 may be formulated to assist a user while typing. While the following examples are provided with respect to a specific illustrative location of the auxiliary display 406, other locations of the auxiliary display 406 may also provide the functionality described with respect to FIGS. 4A-C.

With respect to FIGS. 4A-C, the secondary visual information 422 may include a set of characters 426 representing or corresponding to the keys 418 most recently typed. The secondary visual information 422 may then further include additional text and/or graphical representations relevant to the typing operations, including a set of suggested words 430.

In response to a user's typing input, the device may recognize that a series of characters forms the beginning of a word. In response to identifying a potential word, the auxiliary display 406 may render one or more suggestions 430 representing completed words that may correspond to the user input. The suggested words 430 may include suggested words based on: commonly used words beginning with the recently typed characters 426; words which may be recognized as a correct spelling of a word being typed; words based on a user's typing history; and the like. Words may not necessarily be recognized dictionary words, but may be any collection of alphanumeric characters which may be logically grouped together.

FIG. 4A illustrates these features of the auxiliary display 406. In FIG. 4A, an auxiliary display 406 is positioned along the surface of a trackpad 420. The auxiliary display 406 is shown rendering secondary visual information 422 caused to be displayed by the processing unit. The secondary visual information 422 includes a set of information, specifically, a series of characters 426 representing the most recently typed keys 418; a cursor 428 indicating the location of a similar cursor on the main display; and suggested words 430. The location of the cursor 428 may be coordinated with the location of a cursor displayed on the main display and may follow the most recently typed character.

The one or more suggested words 430 may be rendered on any portion of the auxiliary display 406. In some embodiments, one or more of the suggested words 430 may replace all or some of the recently typed characters 426. As mentioned above, the device may generate the suggested words 430 based on a variety of factors. In one case, the suggested words 430 are based on a stored set of commonly used words which correspond to or partially match the typed characters. Additionally, the suggested words 430 may be based on the typing history of a user. As another example, the suggested words 430 may be based on common spelling mistakes. Additional interactions with auto-suggestions and auto-completions are further illustrated in FIGS. 7A-C, discussed below.

Turning to FIG. 4B, the secondary visual information 422 rendered on the auxiliary display 406 may further comprise contextual information or suggestions based on inputs to the keys 418 or trackpad 420. FIG. 4B illustrates an auxiliary display 406 positioned along the surface of the trackpad 420. The example illustrates how a user typing a special character or keys can cause the auxiliary display 406 to display commands associated with specific operations. In the example of FIG. 4B, a user 434 may press the "control" key 436, causing the secondary visual information 422 to be rendered including information in the form of a series of additional key presses 438 and actions which may be performed 440. In this example, the secondary visual information 422 comprises a list of suggested additional key presses 438 and the corresponding actions 440 that pressing each key would perform.

In general, the secondary visual information 422 includes a set of information that represents a series of options or suggested actions. More specifically, the set of information includes: a first option 442 indicating that if the user presses the "control" and the "c" key, a selected item will be copied; a second option 444 indicating that if the user presses the "control" and the "v" key, a selected item will be pasted; and a third option indicating that if the user presses the "control" and the "x" key, a selected item will be cut. This feature is not limited to this example, and other inputs may result in additional hotkeys, options, suggestions, or other secondary visual information 422 being rendered on the auxiliary display 406.

Referencing FIG. 4C, the auxiliary display 406 may render secondary visual information 422 which includes a set of information that may be a subset of the primary visual information rendered on the main display. As an example, the primary visual information may include text and a graphical interface, such as a software application window, and the secondary visual information 422 may include a portion of the text in the primary visual information. This may allow a user editing a document, for example, to see the text of a portion of the software window on the main display without the need to view the main display.

In the example of FIG. 4C, the secondary visual information 422 rendered on the auxiliary display 406, positioned in the trackpad 420, comprises an area of the primary visual information rendered on the main display. As shown in FIG. 4C, a user may be editing a document on the main display, and the secondary visual information 422 may include information that corresponds to an area around the cursor 428, as it is rendered the main display. As the device receives input from an input device such as the set of keys 418, the trackpad 420, or a sensor in the auxiliary display, the primary visual information and secondary visual information may be updated to include additional information, such as characters representing key inputs and/or an updated position of the cursor 428. The secondary visual information may then include any changes or additions in real time as they would appear on the main display, allowing a user to see the text around any edits on the auxiliary display 406.

The concept illustrated in FIG. 4C may be extended to applications in which the auxiliary display 406 renders a portion of the primary display which corresponds to an area of interest. The area of interest may be determined by the processing unit. The area of interest may be determined, for example, through a location of a cursor within an application, through the location of a mouse pointer, through other user inputs, or using other similar techniques. In one implementation, the device may include visual tracking sensors which are configured to track a user's eye movement, and the detected eye movement may be used to determine and/or define the area of interest.

Figure 5:
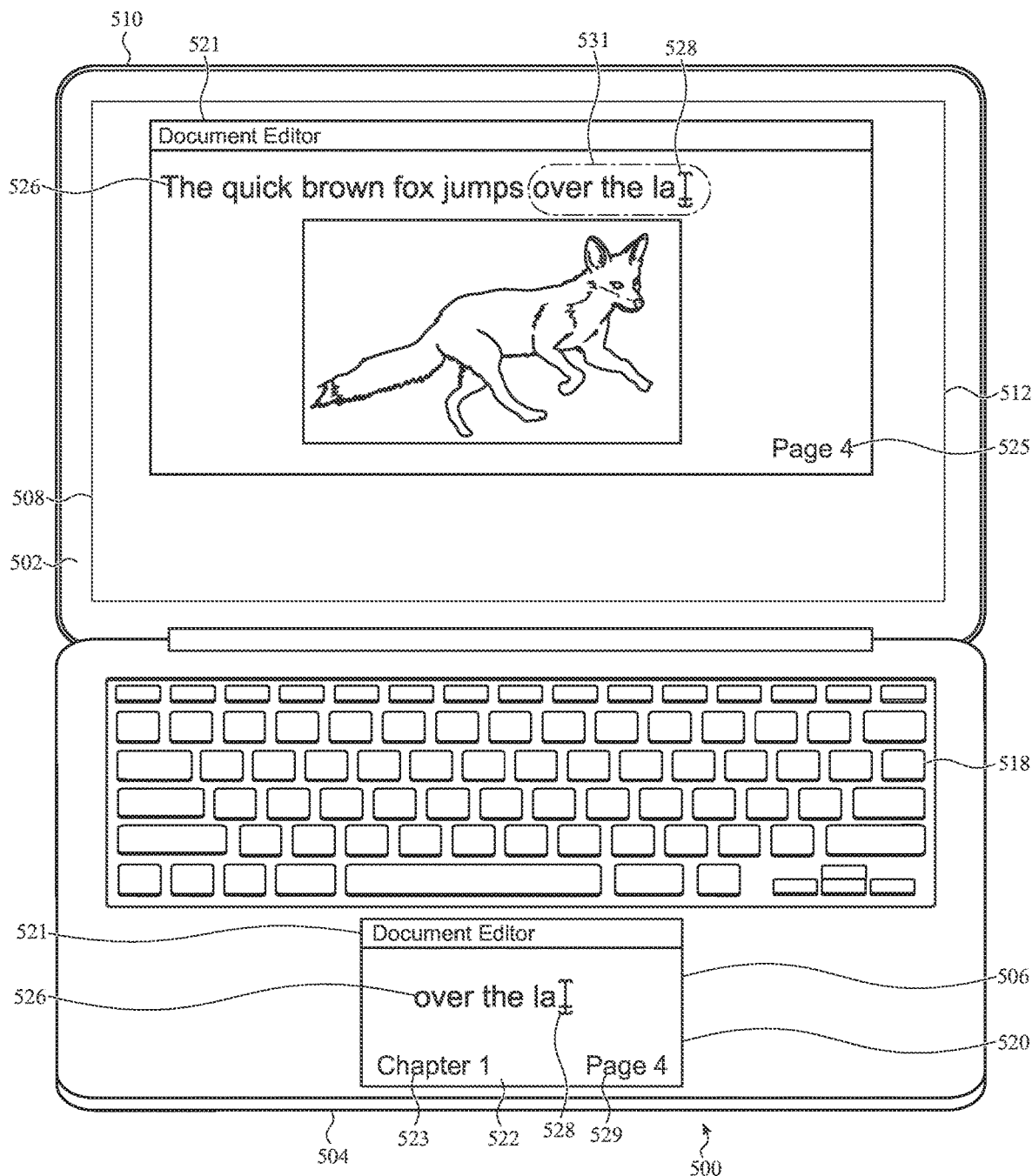
FIG. 5 depicts an example auxiliary display with content that is coordinated with a main display.

As illustrated in FIG. 5, the secondary visual information 522 rendered on the auxiliary display 506 may include a subset of the primary visual information 512 rendered on the main display 508. The secondary visual information 522 may further include information that is generated or rendered in response to inputs received from additional input devices, such as a mouse or trackpad. This may include rendering textual or graphical elements near an area of interest indicated by a cursor 528, a mouse pointer, or similar indication, and it may additionally include information relevant to an active software application.

Similar to the previous examples, in FIG. 5 a device 500 includes an upper portion 502 and a lower portion 504. The upper portion 502 has an enclosure 510 with a main display 508 positioned within the enclosure 510. The lower portion 504 includes a set of keys 518 and an auxiliary display 506 positioned along a trackpad 520. These components correspond to similar components described above with respect to FIGS. 1-2, a redundant description of which is omitted for clarity.

As shown in FIG. 5, the main display 508 is shown rendering primary visual information 512, which includes a first set of information. The first set of information includes a graphical representation of a software application, which may be a document editor application. The document editor application may contain graphical and textual elements, including the name of the application 521 and the active page number 525. The primary visual information 512 may include a set of characters 526 corresponding to the most recently typed keys 518 and a cursor 528 following the most recently typed character.

The auxiliary display 506 is shown rendering secondary visual information 522, which includes a second set of information. The second set of information includes a subset of the first set of information, including a portion of the set of characters 526 and a cursor 528 corresponding to those rendered on the main display 508. The second set of information also includes the name of the application 521 and the active page number 525. The second set of information may further include additional information from the software application not rendered on the main display 508, such as the current chapter 523.

As also illustrated in FIG. 5, an area of interest 531 may be defined to correspond to a region or area within the main display 508. The primary visual information 512 rendered on the main display 508 may include a first set of information and the area of interest 531 may correspond to a subset of the first set of information that falls within the region defined by the area of interest 535. The processing unit may determine the area of interest as the area surrounding a cursor 528, the area surrounding a mouse pointer, by inputs received from another input device such as a sensor, through software application control, or similar means.

Once the area of interest is determined, the auxiliary display 506 may render text and/or graphical elements that correspond to the subset of the first set of information that falls within the area of interest. In this example, the auxiliary display 506 renders secondary visual information 522 (e.g., a second set of information) that includes the subset of the first set of information that corresponds to the area of interest 531. More specifically, the auxiliary display 506 renders a portion of the text 526 that falls within the region of the area of interest 531 (e.g., the text "over the la".)

Figure 6A:
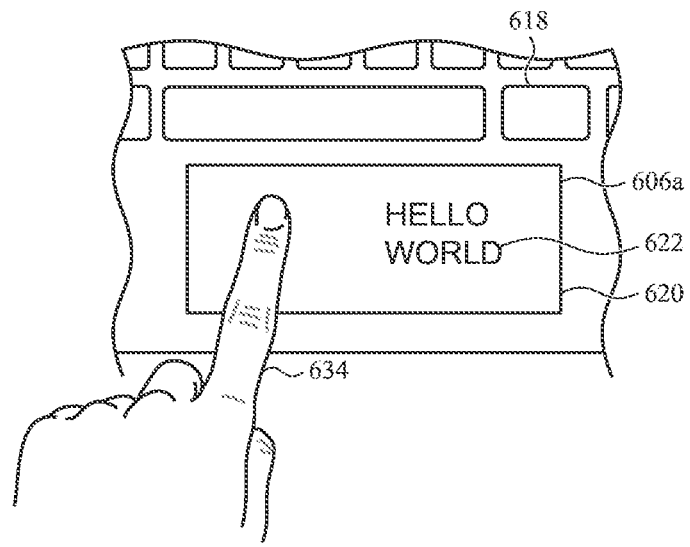
FIGS. 6A-D depict example functionality of the auxiliary display.
Figure 6B:
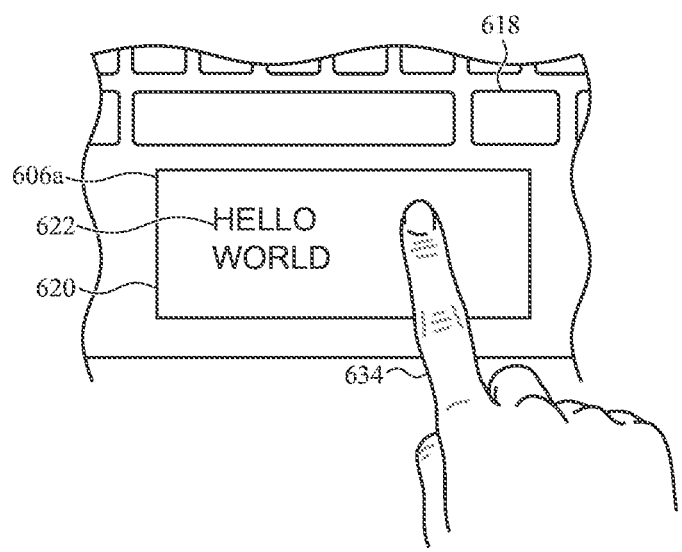

Referencing FIGS. 6A-D, the auxiliary display 606a-b may be configured to respond to the detection of a touch or a visual obstruction (e.g., a finger 634) on a portion of the auxiliary display 606a-b. For example, if the auxiliary display 606a includes a touch sensor (see e.g., FIG. 2), the touch sensor may be configured to detect an obstruction on a portion of the auxiliary display 606a. As illustrated in FIGS. 6A and 6B, in response to the detection of an obstruction, the secondary visual information 622 on the auxiliary display 606a may be rendered in a new location away from the detected obstruction. In some cases, the new location allows all of the rendered secondary visual information 622 to remain visible despite the presence of the obstruction (e.g., finger 634). This same functionality can be extended in the case of an auxiliary display 606b which may include a different sensor or other method of detecting an obstruction, as in FIGS. 6C and 6D.

For example, FIG. 6A illustrates an auxiliary display 606a positioned along the surface of a trackpad 620 below a set of keys 618. The auxiliary display 606a includes a touch sensor as shown in FIG. 2. The touch sensor in the auxiliary display 606a detects the presence of an obstruction, such as a user's finger 634, on the left side of the auxiliary display 606a. The processing unit receives input from the touch sensors and causes the secondary visual information 622 to be rendered on the right side of the auxiliary display 606a away from the finger 634. FIG. 6B demonstrates the same embodiment as FIG. 6A, with the finger 634 now on the right side of the auxiliary display 606a, causing the secondary visual information 622 to be rendered on the left.

Figure 6C:
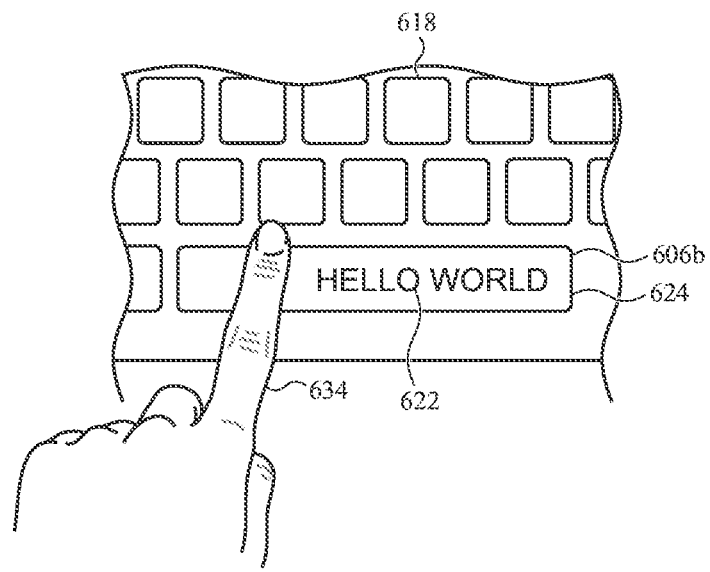
Figure 6D:
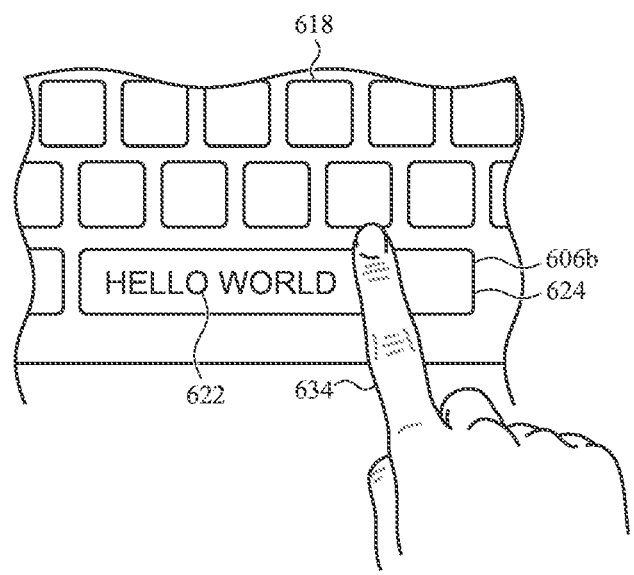

In FIGS. 6C and 6D, the auxiliary display 606b is located on the surface of the space bar 624. The auxiliary display 606b may comprise one or more touch sensors, as in the examples of FIGS. 6A and 6B. Where touch sensitivity is not desired, the auxiliary display 606b may similarly comprise one or more infrared or other sensors which can detect the presence of an obstruction such as a finger 634. Alternatively, the user may input the presence of an obstruction to the device, or the device may be configured to store or identify a preference of where the user typically rests a finger 634.

In some embodiments, the processing unit (e.g., processing unit 1170 of FIG. 11) is configured to respond to the presence of an obstruction such as a user's finger 634 over a portion of the auxiliary display 606b. The presence of the obstruction may be detected using one or more of the sensing techniques described above. The processing unit then renders the secondary visual information 622 away from the obstruction (e.g., finger 634). It should be understood that this feature is not limited to embodiments where the auxiliary display 606 is positioned within the set of keys 618 or the trackpad 620, but can also be extended to an auxiliary display 606 in other locations or configurations.

Figure 7A:
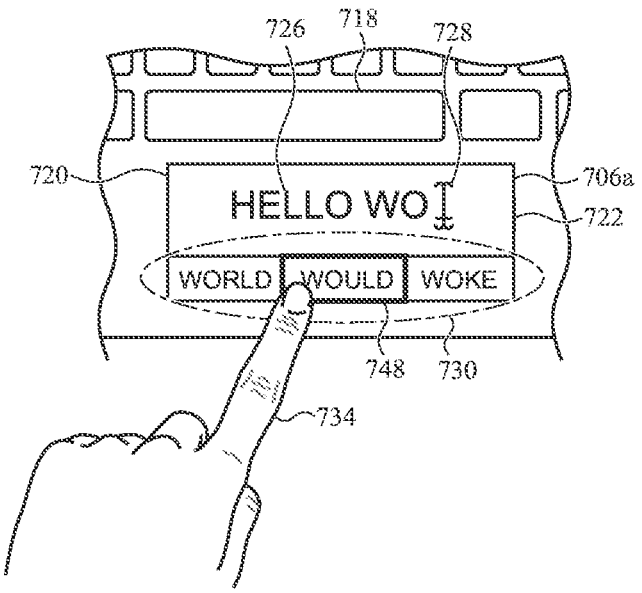
FIGS. 7A-C depict example responsive interactions between a user and the auxiliary display.
Figure 7B:
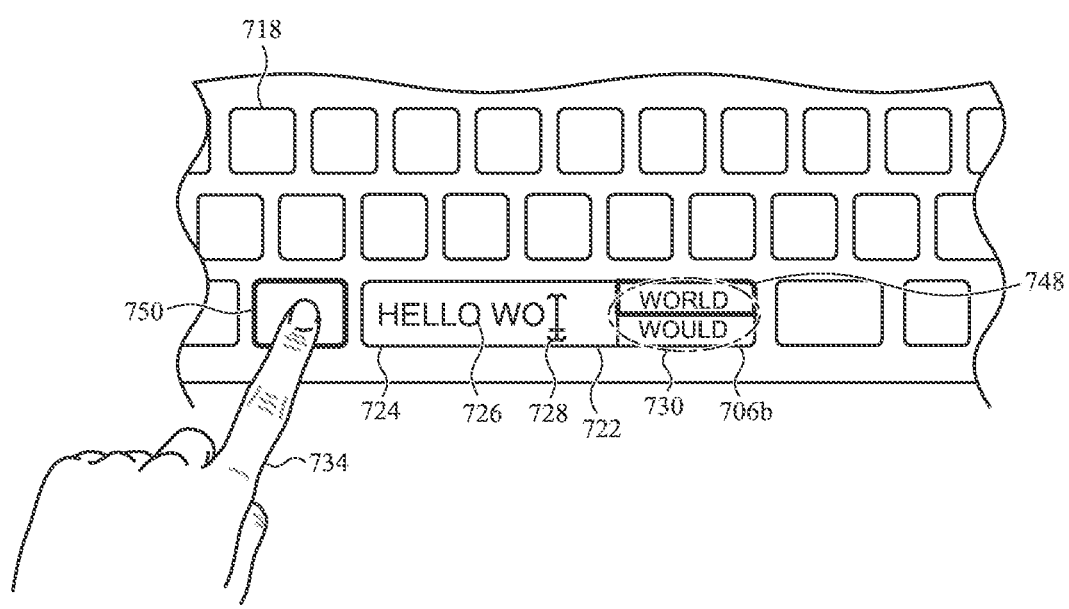
Figure 7C:
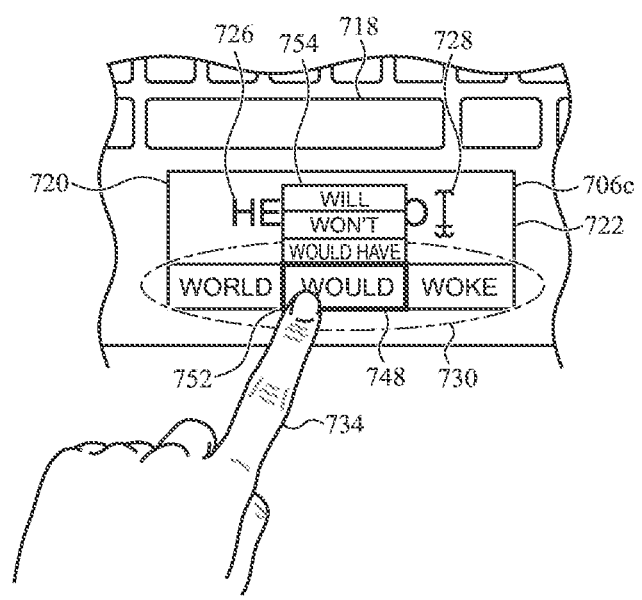

As described above, the auxiliary display may define a touch-sensitive surface that enables a user to interact with the rendered secondary visual information. Examples of this functionality are illustrated in FIGS. 7A-C. In the example of FIG. 7A, the auxiliary display 706a includes a touch sensor, similar to the touch sensor described above with respect to FIG. 2. In response to the touch sensor detecting (touch) input from the user, primary visual information may be rendered on the main display and the secondary visual information 722 may be rendered on the auxiliary display 706a.

In some cases, the primary and secondary visual information may be updated to include a graphical representation corresponding to the location of the touch on the surface of the auxiliary display 706a. For example, FIG. 7A depicts an auxiliary display 706a that combines the touch sensor of FIG. 2 with the auto-suggest feature illustrated in FIG. 4A. By providing a touch-sensitive surface, the auxiliary display 706a may allow for a user to quickly select one of the suggested words and have that word inserted into both the primary visual information on the main display and the secondary visual information 722 on the auxiliary display 706a.

In FIG. 7A, the auxiliary display 706a (positioned within the trackpad 720) renders secondary visual information 722, which is comprised of a set of characters 726 representing recent inputs from the set of keys 718. A cursor 728 follows the most recently typed characters 726, indicating the location where a next character would appear. Here, the cursor 728 follows a partially typed word. In some instances, a processing unit recognizes that the cursor 728 follows a partial word, and causes the auxiliary display 706a to render one or more suggested words 730 which may complete the partial word. The user 734 may select a desired word 748 by touching a portion of the auxiliary display 706a which corresponds to the desired word 748. The touch sensor in the auxiliary display 706a may detect the user touch 734; the processing unit may acknowledge the selection and may insert the desired word 748 into the text.

Alternatively, as shown in FIG. 7B, the user 734 may select a desired word 748 by touching a particular key 750 or another means. In FIG. 7B, an auxiliary display 706*b* is positioned on the surface of a space bar 724. The auxiliary display 706*b* renders secondary visual information 722, comprised of a set of characters 726, a cursor 728 following the most recently typed characters, and one or more suggested words 730. The user 734 may select a desired word 748 by pressing a particular key 750. The processing unit recognizes the pressing of the particular key 750 as the selection of the desired word 748 and represents the selection by inserting the desired word 748 into the primary visual information and secondary visual information 722.

Referencing FIG. 7C, the auxiliary display 706*c* may include a force sensor, similar to the force sensor described above with respect to FIG. 2. When the force sensor detects or estimates that an amount of force exceeding a threshold is applied to the surface of the auxiliary display 706*c*, the auxiliary display 706*c* may render secondary visual information 722 including one or more user-selectable items. The user-selectable items may include, for example, additional word suggestions, or items indicating a variety of other options and actions which may be executed, such as searching the web, looking up a word in a dictionary or thesaurus, or otherwise interacting with the auxiliary display 706*c* and device resources. An item may then be selected, for example by touching a portion of the auxiliary display 706*c* corresponding to the desired selectable item.

By way of example, FIG. 7C depicts an auxiliary display 706*c* positioned along the surface of a trackpad 720 below a set of keys 718. The auxiliary display 706*c* may include both a touch sensor and a force sensor as described above with respect to FIG. 2. The auxiliary display 706*c* may render secondary visual information 722, which includes a set of characters 726 representing recent inputs from the set of keys 718. A cursor 728 may follow the most recently typed characters 726. The processing unit may recognize that the cursor 728 follows a partial word, and cause one or more suggested words 730 to be rendered, which may complete the partial word. In response to an applied force, the auxiliary display 706*c* may render further selectable items based on or corresponding to the selected word 748. In particular, in response to a touch having a force that exceeds a threshold, the secondary visual information 722 may be updated to include a dialog box 754 with additional suggestions; here, other forms of the selected word 748.

In embodiments that include a haptic element (shown in FIG. 11), the auxiliary display 706*a* may also be configured to provide haptic feedback to a user. Returning to the example of FIG. 7A, when a user 734 selects a desired word 748, the auxiliary display 706*a* may provide haptic feedback, such as a clicking or tapping tactile sensation, at the surface of the auxiliary display 706*a*. In some cases, the haptic output is coupled or coordinated with an audio output that provides audio feedback for the user interaction with the auxiliary display 706*a*. Returning to the example of FIG. 7C, haptic feedback may be further affected by an applied force. For example, in response to a touch having a force that exceeds a threshold, the clicking, tapping, or other tactile sensation may be increased in magnitude or frequency.

Figure 8:
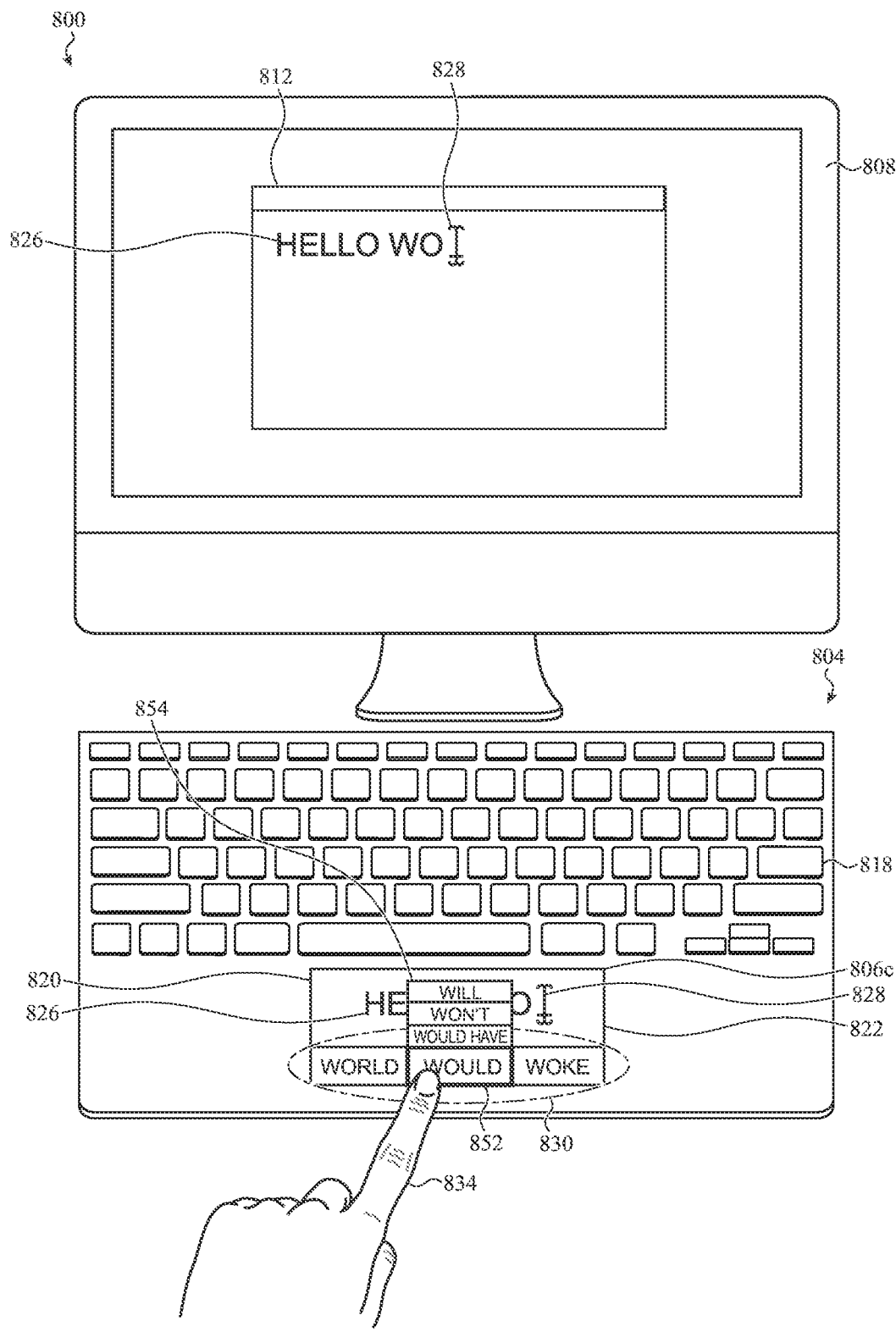
FIG. 8 depicts an example responsive interaction between a user and the auxiliary display with the context of the main display.

FIGS. 8, 9 and 10A-10C depict other example functionality of an auxiliary display. FIG. 8 illustrates a device 800 with a main display 808 and a lower portion 804 or keyboard which includes a set of keys 818 and an auxiliary display 806. The main display 808 renders primary visual information 812, which includes a first set of information, including a software application window, a set of characters 826, and a cursor 828.

The auxiliary display 806 renders secondary visual information 822, which includes a second set of information which includes a subset of the first set of information from the primary visual information 812, including the set of characters 826 and the cursor 828. The auxiliary display 806 also includes a touch sensor and a force sensor as illustrated in FIG. 2. The secondary visual information 822 rendered on the auxiliary display 806 further comprises one or more suggested words 830 which may complete a partial word.

Detected input from the touch of a user 834 may cause the secondary visual information 822 to include further selectable items by executing a force touch 852 on a portion of the auxiliary display 806. The one or more force sensors in the auxiliary display 806 detect the force touch 852 and the processing unit causes the secondary visual information 822 to include a dialog box 854 with additional suggestions. As depicted in FIG. 8, some of the features of the auxiliary display 820 may be rendered only on the auxiliary display 820 and not on the main display 808. For example, where the auxiliary display 820 renders secondary visual information 822 including suggested words 830 based on recent key inputs, the primary visual information may or may not render the suggested words 830.

Figure 9:
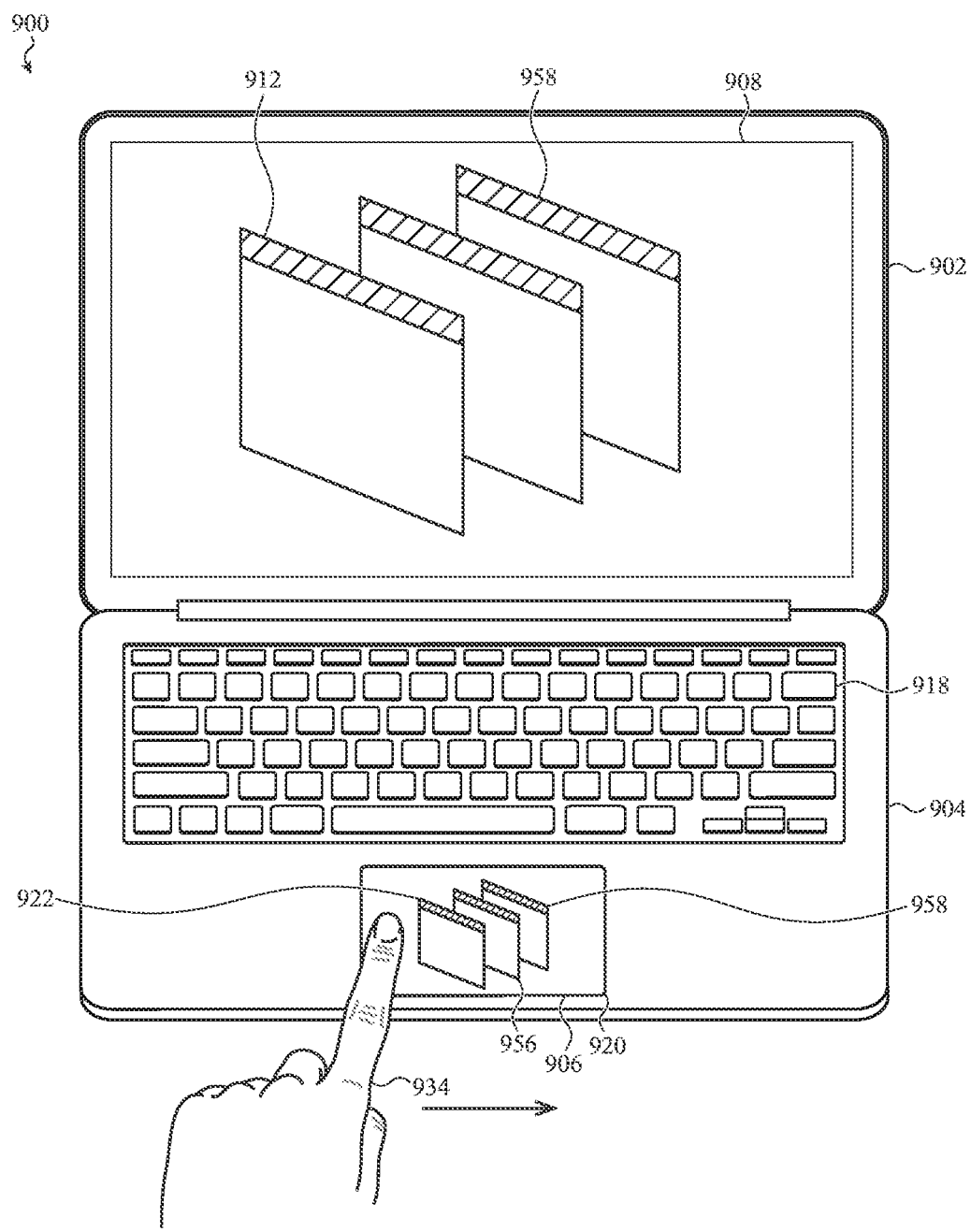
FIG. 9 depicts an example of the auxiliary display mimicking the main display in response to inputs.

In FIG. 9, the device 900 comprises an upper portion 902 having a main display 908 configured to render primary visual information 912 and a lower portion 904 having an auxiliary display 906 configured to render secondary visual information 922. The auxiliary display 906 is positioned along a trackpad 920 below a set of keys 918. The processing unit may be configured to recognize a gesture made on the surface of the auxiliary display 906 and may be configured to cause the auxiliary display 906 to render secondary visual information 922 which comprises a visually scaled version 956 of the primary visual information 912.

In the example of FIG. 9, the secondary visual information 922 rendered on the auxiliary display 906 may include a subset of the primary visual information 912 rendered on the main display 908. The primary visual information 912 may include a rich graphical representation, such as an operating system desktop with application windows, while the secondary visual information may include a visually scaled version of the primary visual information. The auxiliary display 906 may render a lower resolution version of the rich graphical representation on the main display 912, or it may be a smaller version at a similar resolution. Or the auxiliary display 906 may render a simplified version of the richer content on the main display 912.

The auxiliary display 906 may be configured to render a visually scaled version of the main display 908 in response to a gesture on the trackpad 920 or touch-sensitive auxiliary display 906, a keystroke combination, or another input. This allows the user to perform actions which more globally affect items rendered on the main display 908 while maintaining visual focus on the lower portion 904. By way of example, as shown in FIG. 9, the primary visual information 912 includes a representation of multiple desktops 958, and the secondary visual information 922 includes a visually scaled version 956 of the representation of multiple desktops 958. As the user slides a finger 934 along the surface of the auxiliary display 906 (example gesture), both the primary visual information 912 and secondary visual information 922 show a graphical representation of the device switching between the multiple desktops 958. In embodiments that include a haptic element, a haptic output and/or an audio output may be produced in response to a user interaction with the auxiliary display. For example, a tactile feedback sensation including, for example, a rumble or vibration, may be provided to the user while sliding a finger 934 along the surface of the auxiliary display 906.

Figure 10A:
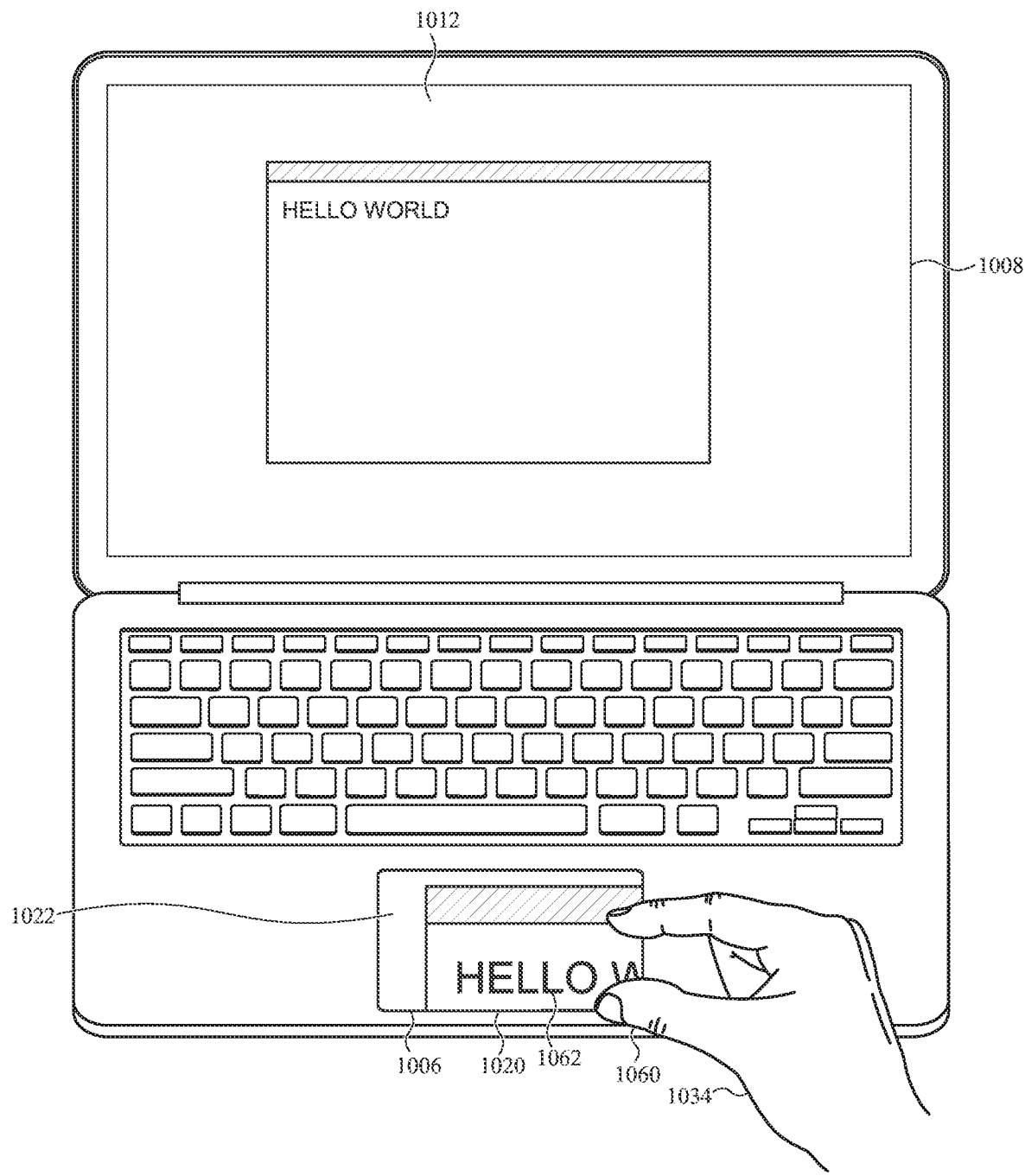
FIGS. 10A-C depict example auxiliary display responses to gesture inputs.
Figure 10B:
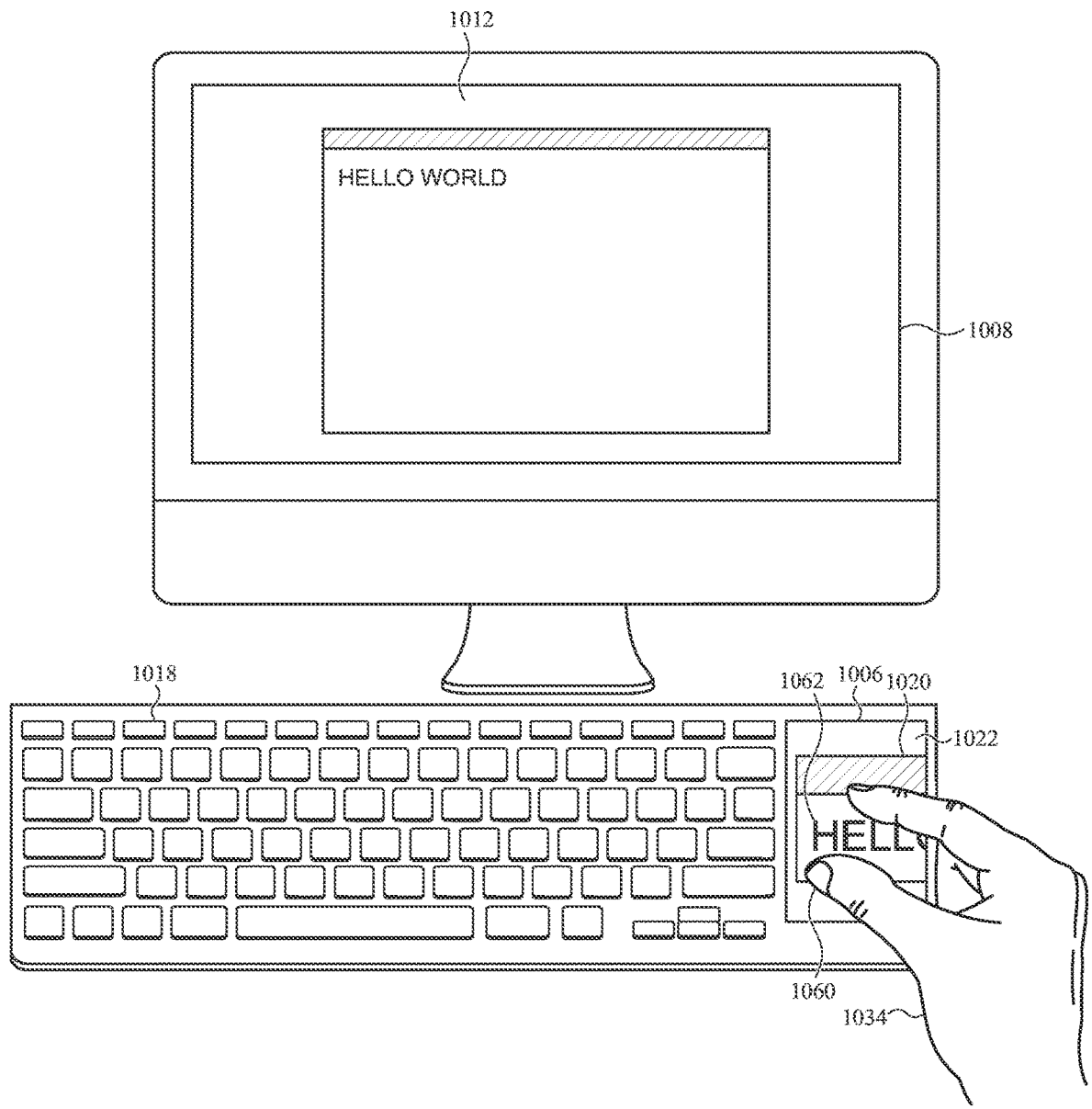
Figure 10C:
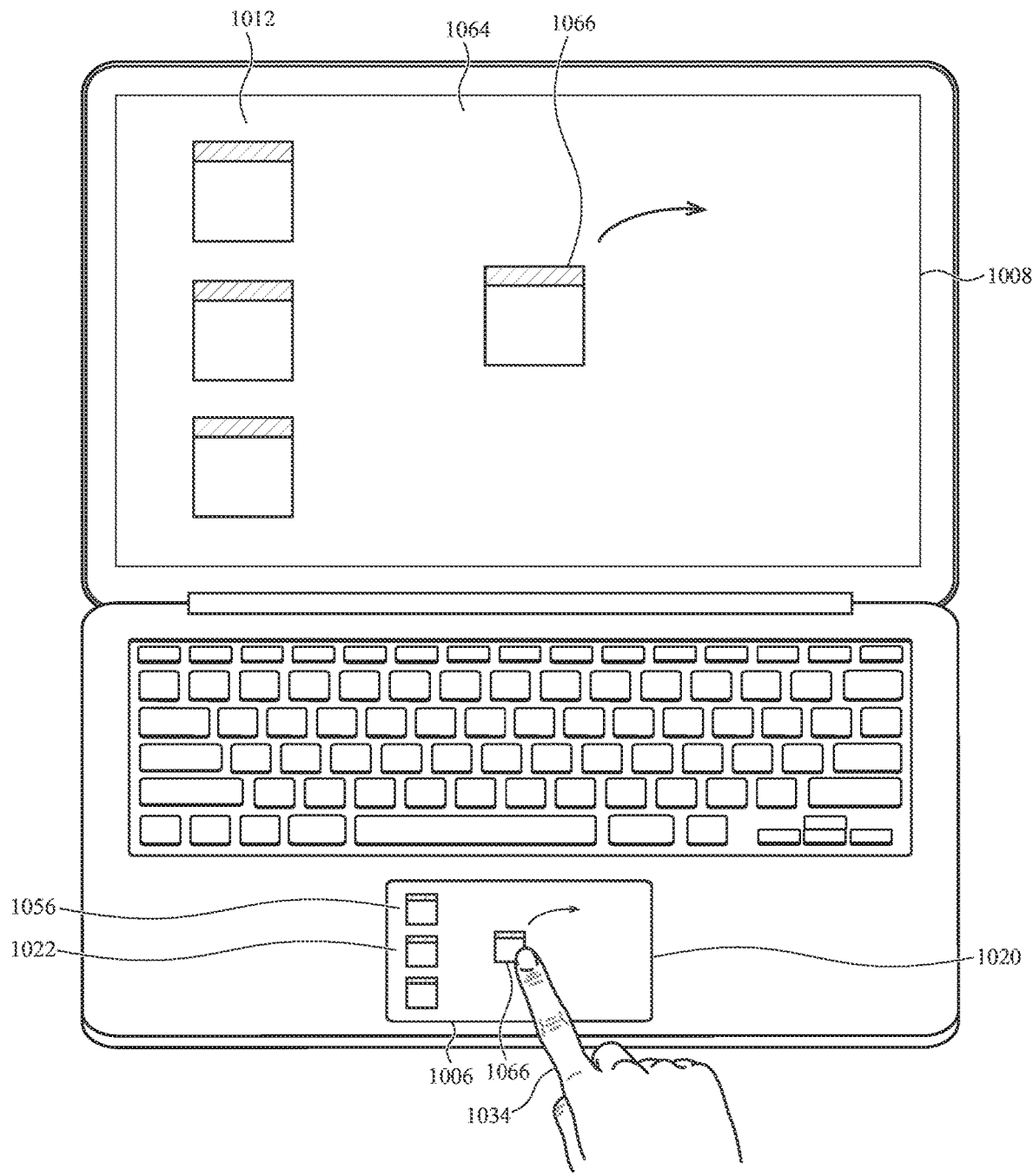

As illustrated in FIGS. 10A-C, other gestures may cause the auxiliary display 1006 to render a visually scaled version of the main display 1008 or a portion of the rich graphical representation on the main display 1008, and cause the secondary visual information 1022 on the auxiliary display 1006 to mimic the primary visual information 1012 on the main display 1008.

For example, where the auxiliary display 1006 renders a visually scaled version of the main display 1008, performing a pinching gesture 1060 can cause the auxiliary display 1006 to be zoomed in and out on a portion of the main display 1008. In addition, where the auxiliary display 1006 renders a set of characters during typing, the same pinching gesture 1060 can cause the number of characters rendered to increase or decrease, or to grow or shrink in size.

This feature is demonstrated in FIG. 10A, showing a main display 1008 rendering primary visual information 1012 and an auxiliary display 1006 located on the surface of a trackpad 1020 rendering secondary visual information 1022. The primary visual information 1012 may include a graphical representation of an application window, and the secondary visual information 1022 may include a simplified or visually scaled version of the primary visual information 1012. The auxiliary display 1006 includes a touch sensor as illustrated in FIG. 2. When a user 1034 performs a pinching gesture 1060 on the touch-sensitive surface of the auxiliary display 1006, the processing unit causes the secondary visual information 1022 to represent a zoomed portion 1062 of the primary visual information 1012 without affecting the primary visual information 1012.

FIG. 10B illustrates that the features of FIG. 10A may be included in other layout configurations. In particular, FIG. 10B illustrates a main display 1008 rendering primary visual information 1012 and an auxiliary display 1006 located on the lower portion adjacent the set of keys 1018. The primary visual information 1012 may include a graphical representation of an application window, and the secondary visual information 1022 may include a simplified or visually scaled version of the primary visual information 1012. The auxiliary display 1006 includes a touch sensor as illustrated in FIG. 2. When a user 1034 performs a pinching gesture 1060 on the touch-sensitive surface of the auxiliary display 1006, the processing unit causes the secondary visual information 1022 to represent a zoomed portion 1062 of the primary visual information 1012 without affecting the primary visual information 1012.

Gestures performed on a touch-sensitive auxiliary display 1006 may alternatively affect both the primary visual information 1012 on the main display 1008 and the secondary visual information 1022 on the auxiliary display 1006, as illustrated in FIG. 10C. FIG. 10C illustrates a main display 1008 rendering primary visual information 1012 and an auxiliary display 1006 located on the surface of a trackpad 1020 rendering secondary visual information 1022. The auxiliary display includes a touch sensor as illustrated in FIG. 2.

The primary visual information 1012 consists of a desktop 1064 with a plurality of icons 1066, and the secondary visual information 1022 consists of a visually scaled version 1056 of the primary visual information 1012. A user's finger 1034 touches and holds a portion of the auxiliary display 1006 corresponding to an icon 1066. The finger 1034 then slides along the touch-sensitive surface of the auxiliary display 1006. The processing unit causes the icon 1066 represented in both the primary visual information 1012 and the secondary visual information 1022 to move along with the finger 1034. These types of mirrored actions can occur under a variety of other gestures and inputs as well.

FIG. 11 depicts example components of an electronic computing device in accordance with the embodiments described herein. The schematic representation depicted in FIG. 11 may correspond to components of the devices depicted in FIGS. 1-10C, described above. However, FIG. 11 may also more generally represent other types of devices that include an auxiliary display configured to render secondary visual information in accordance with the embodiments described herein.

As shown in FIG. 11, a device 1100 includes a processing unit 1170 operatively connected to computer memory 1172 and computer-readable media 1174. The processing unit 1170 may be operatively connected to the memory 1172 and computer-readable media 1174 components via an electronic bus or bridge. The processing unit 1170 may include one or more computer processors or microcontrollers that are configured to perform operations in response to computer-readable instructions. The processing unit 1170 may include the central processing unit (CPU) of the device 1100. Additionally or alternatively, the processing unit 1170 may include other processors within the device 1100 including application specific integrated chips (ASIC) and other microcontroller devices. The processing unit 1170 may be configured to perform functionality described in the examples above.

The memory 1172 may include a variety of types of non-transitory computer-readable storage media, including, for example, read access memory (RAM), read-only memory (ROM), erasable programmable memory (e.g., EPROM and EEPROM), or flash memory. The memory 1172 is configured to store computer-readable instructions, sensor values, and other persistent software elements. Computer-readable media 1174 also includes a variety of types of non-transitory computer-readable storage media including, for example, a hard-drive storage device, a solid state storage device, a portable magnetic storage device, or other similar device. The computer-readable media 1174 may also be configured to store computer-readable instructions, sensor values, and other persistent software elements.

In this example, the processing unit 1170 is operable to read computer-readable instructions stored on the memory 1172 and/or computer-readable media 1174. The computer-readable instructions may adapt the processing unit 1170 to perform the operations or functions described above with respect to FIGS. 1-10C and below with respect to FIGS. 12 and 13. In particular, the processing unit 1170, the memory 1172, and/or the computer-readable media 1174 may be configured to cause primary visual information to be rendered on a main display 1108 and secondary visual information to be rendered on an auxiliary display 1106 of the device 1100. The computer-readable instructions may be provided as a computer-program product, software application, or the like.

As shown in FIG. 11, the device 1100 also includes a main display 1108 that is configured to render primary visual information generated by the processing unit 1170. The main display 1108 may include a liquid-crystal display (LCD), organic light emitting diode (OLED) display, organic electroluminescent (OEL) display, or the like. If the main display 1108 is an LCD, the display may also include a backlight component that can be controlled to provide variable levels of display brightness. If the main display 1108 is an OLED or OEL type display, the brightness of the main display 1108 may be controlled by modifying the electrical signals that are provided to display elements.

The device 1100 also includes an auxiliary display 1106 that is configured to render secondary visual information generated by the processing unit 1170. The auxiliary display 1106 may include a liquid-crystal display (LCD), organic light emitting diode (OLED) display, organic electroluminescent (OEL) display, or the like. If the auxiliary display 1106 is an LCD, the display may also include a backlight component that can be controlled to provide variable levels of display brightness. If the auxiliary display 1106 is an OLED or OEL type display, the brightness of the auxiliary display 1106 may be controlled by modifying the electrical signals that are provided to display elements.

The device 1100 may also include a battery 1176 that is configured to provide electrical power to the components of the device 1100. The battery 1176 may include one or more power storage cells that are linked together to provide an internal supply of electrical power. The battery 1176 may be operatively coupled to power management circuitry that is configured to provide appropriate voltage and power levels for individual components or groups of components within the device 1100. The battery 1176, via power management circuitry, may be configured to receive power from an external source, such as an AC power outlet. The battery 1176 may store received power so that the device 1100 may operate without connection to an external power source for an extended period of time, which may range from several hours to several days.

In some embodiments, the device 1100 includes one or more input devices 1178. The input device 1178 is a device that is configured to receive user input. The input device 1178 may include, for example, a push button, a touch-activated button, or the like. In some embodiments, the input device 1178 may provide a dedicated or primary function, including, for example, a power button, volume buttons, home buttons, scroll wheels, and camera buttons. Generally, keyboard keys, a touch sensor, and a force sensor may also be classified as input devices. However, for purposes of this illustrative example, the keyboard keys 1118, touch sensor 1180 and force sensor 1182 are depicted as distinct components within the device 1100.

The device 1100 may also include a touch sensor 1180 that is configured to determine a location of a touch over a touch-sensitive surface of the device 1100. The touch sensor 1180 may include a capacitive array of electrodes or nodes that operate in accordance with a mutual-capacitance or self-capacitance scheme. The touch sensor 1180 may be integrated with an auxiliary display to form a touch-sensitive display similar to the example described above with respect to FIG. 2. The touch sensor 1180 may also be integrated with another component that forms an external surface of the device 1100 to define a touch-sensitive surface.

The device 1100 may also include a force sensor 1182 that is configured to receive force touch input over a touch-sensitive surface of the device 1100. The force sensor 1182 may include one or more layers that are sensitive to strain or pressure applied to an external surface of the device. In accordance with the embodiments described herein, the force sensor 1182 may be configured to operate using a dynamic or adjustable force threshold. The dynamic or adjustable force threshold may be implemented using the processing unit 1170 and/or circuitry associated with or dedicated to the operation of the force sensor 1182.

The device 1100 may also include one or more sensors 1184 that may be used to detect an environmental condition, orientation, position, or some other aspect of the device 1100. Example sensors 1184 that may be included in the device 1100 include, without limitation, one or more accelerometers, gyrometers, inclinometers, goniometers, or magnetometers. The sensors 1184 may also include one or more proximity sensors, such as a magnetic hall-effect sensor, inductive sensor, capacitive sensor, continuity sensor, and the like. The proximity sensor(s) may be configured to detect the presence of a support structure or support surface and used to determine a support configuration in accordance with some embodiments.

The sensors 1184 may also be broadly defined to include wireless positioning devices including, without limitation, global positioning system (GPS) circuitry, Wi-Fi circuitry, cellular communication circuitry, and the like. The device 1100 may also include one or more optical sensors including, without limitation, photodetectors, photosensors, image sensors, infrared sensors, and the like. While the camera 1186 is depicted as a separate element in FIG. 11, a broad definition of sensors 1184 may also include the camera 1186 with or without an accompanying light source or flash. The sensors 1184 may also include one or more acoustic elements, such as a microphone used alone or in combination with a speaker element. The sensors may also include a temperature sensor, barometer, pressure sensor, altimeter, moisture sensor or other similar environmental sensor.

The sensors 1184, either alone or in combination, may generally be configured to determine an orientation, position, and/or movement of the device 1100. The sensors 1184 may also be configured to determine one or more environmental conditions, such as a temperature, air pressure, humidity, and so on.

The device 1100 may also include a camera 1186 that is configured to capture a digital image or other optical data. The camera 1186 may include a charge-coupled device, complementary metal oxide (CMOS) device, or other device configured to convert light into electrical signals. The camera 1186 may also include one or more light sources, such as a strobe, flash, or other light-emitting device. The camera 1186 may be generally categorized as a sensor for detecting optical conditions and/or objects in the proximity of the device 1100. However, the camera 1186 may also be used to create photorealistic images that may be stored in an electronic format, such as JPG, GIF, TIFF, PNG, raw image file, or other similar file types.

The device 1100 may also include a communication port 1188 that is configured to transmit and/or receive signals or electrical communication from an external or separate device. The communication port 1188 may be configured to couple to an external device via a cable, adaptor, or other type of electrical connector. In some embodiments, the communication port 1188 may be used to couple the device 1100 to an accessory, such as an external keyboard, a mouse, an external storage drive, or other device configured to send and/or receive electrical signals. The communication port 1188 may be configured to receive identifying information from an external accessory, which may be used to determine a communication configuration.

The device 1100 may also include a haptic element 1190 that is configured to produce a haptic output to provide haptic feedback at a surface of the device 1100. In particular, the haptic element 1190 may be configured to produce a haptic output to a surface of the auxiliary display 1106. The haptic element 1190 may provide various types of tactile feedback, such as vibrating, tapping, changes in friction, temperature changes, etc. The haptic element 1190 may include a motor, such as a spinning motor with an eccentric weight, a solenoid motor, a linear actuator, or other similar mechanism that is configured to produce a haptic output on an exterior surface of the device 1100. The haptic element 1190 may be implemented using a variety of techniques for providing haptic output including, for example, electromechanical, electrostatic, piezoelectric, acoustic, electrostimulation, and similar suitable techniques. The haptic element 1190 may be activated and/or controlled by the processing unit 1170. Haptic feedback may be in response to inputs from the touch sensor 1180, force sensor 1182, or other input devices 1178, or it may be initiated by software or other controls. In some cases, the haptic output produced by the haptic element 1190 may be paired or coordinated with an audio output of a speaker or other acoustic device.

Figure 12:
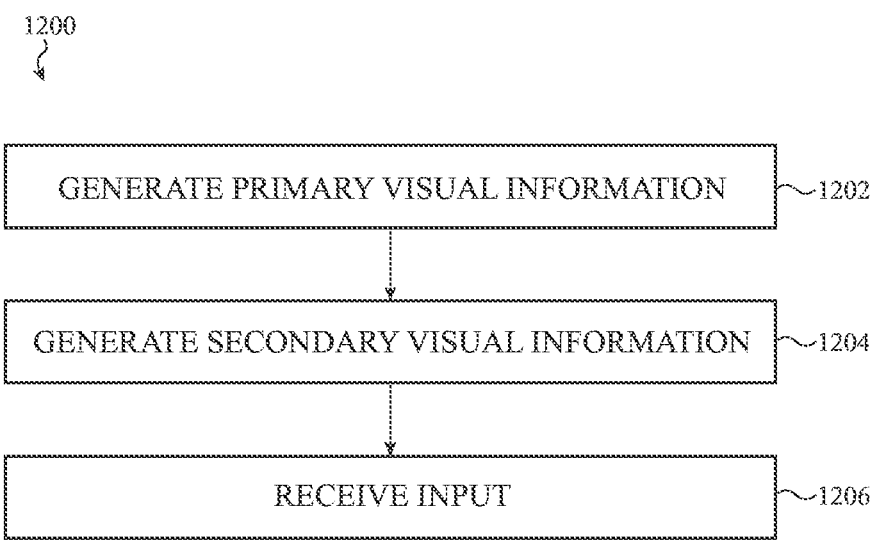
FIG. 12 depicts an example process of operating an auxiliary display of a device.

FIG. 12 illustrates an example process 1200 for operating an auxiliary display of a device. The process 1200 may be implemented on any of the example devices discussed above with respect to FIGS. 1-11. The following process 1200 may be used to render contextual information on an auxiliary display using, for example, the processing unit and other hardware elements described with respect to FIG. 11 or other embodiments described herein. The process 1200 may be implemented as processor-executable instructions that are stored within the memory of the device.

In operation 1202, primary visual information is generated. The primary visual information may be rendered on a main display. In some examples, the primary visual information may include text or characters. The text or characters may be generated based on recent inputs to the device, or may represent text or characters previously stored in system memory. In other examples, the primary visual information may additionally or alternatively include a rich graphical user interface, such as an operating system desktop, one or more application windows, and/or a location indicator such as a cursor or a mouse pointer.

In operation 1204, secondary visual information is generated, which may be rendered on an auxiliary display. In some examples, the secondary information may be generated based at least in part on past inputs to the device. In other examples, the secondary visual information may be a subset of the primary visual information, such as a portion of the text in the primary visual information. The secondary visual information may include a visually scaled or simplified version of the rich graphical user interface in the primary visual information.

In operation 1206, input is received. The input may be generated by a set of keys, inputs to a trackpad, or inputs from one or more sensors. For example, a user may actuate one or more of the set of keys, which action may be represented by an alphanumeric character. In other examples, the input may be generated by a touch being detected on the surface of an auxiliary display which includes a touch sensor. The detected touch may indicate the location of the touch and may correspond to an action to be executed by the device.

In operation 1206, the input may cause new primary visual information to be rendered on the main display and new secondary information to be rendered on the auxiliary display. For example, where input from one or more keys is received, it may cause additional information, such as a set of characters, to be included in the primary visual information and the secondary visual information, allowing a user to see the characters that have been typed on either display. Other inputs may cause still other responses. For example, where a touch on the surface of the auxiliary display is registered by the touch sensor it may cause a word corresponding to that portion of the auxiliary display to be inserted into the primary visual information and the secondary visual information. In some embodiments, in response to input from an input device the primary visual information and secondary visual information may be updated to include additional information associated with the input. The operations of process 1200 are merely illustrative in nature and are not intended to be limiting.

Figure 13:
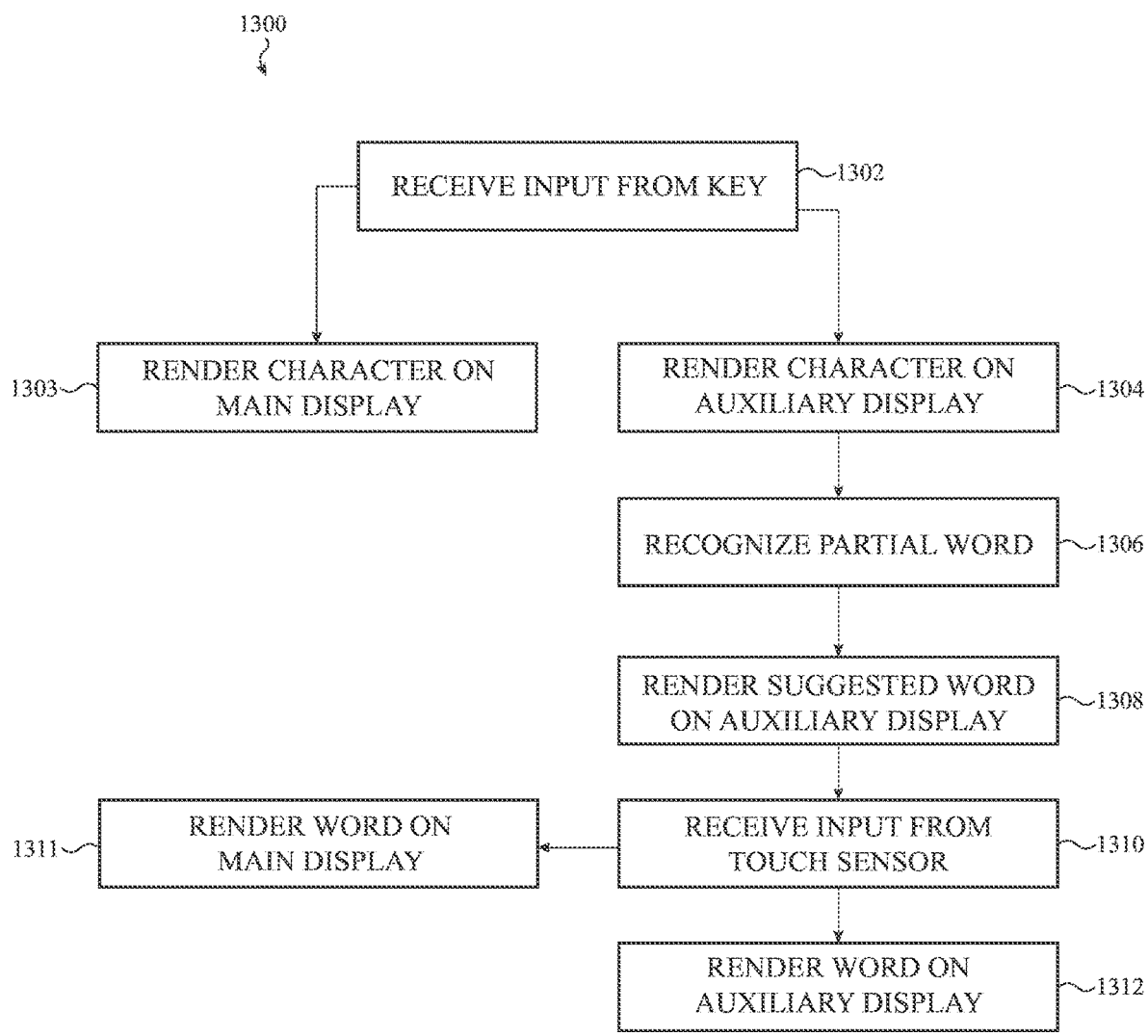
FIG. 13 depicts an example process of suggesting words to a user using an auxiliary display.

FIG. 13 illustrates an example process 1300 for suggesting a word to a typing user. The process 1300 may be implemented on any of the example devices discussed above with respect to FIGS. 1-11. The following process 1300 may be used to render suggested words on an auxiliary display using, for example, the processing unit and other hardware elements described with respect to FIG. 11 or other embodiments described herein. The process 1300 may be implemented as processor-executable instructions that are stored within the memory of the device.

In operation 1302, input is received from a key. The input may be generated by a user pressing a key, wherein a corresponding electrical signal is generated. The key may represent an alphanumeric character.

In operation 1303, an alphanumeric character corresponding to the input is rendered on the main display. In some examples, the main display may previously consist of a rich graphical user interface such as an operating desktop with an application window. The application window may consist of text, such as a document. When the input is received in operation 1302, in operation 1303 the corresponding character may be visually rendered within the document.

Similarly, in operation 1304 an alphanumeric character corresponding to the input is rendered on the auxiliary display. Operation 1304 may be executed substantially concurrently with operation 1303, and the characters rendered on both the auxiliary display and the main display may be the same. In some examples, the auxiliary display may previously consist of a simplified graphical interface with a series of characters representing the most recently received inputs. When the input is received in operation 1302, in operation 1304 the corresponding character may be added to the series of characters in the auxiliary display.

In operation 1306, a partial word is recognized by process 1300. For example, the character corresponding to the input received in operation 1302 may be recognized as the beginning of a word. Where other inputs have previously been received, more than one consecutive character may be recognized as the beginning of a word.

In operation 1308, a selectable item, which in this example may be a suggested word, is rendered on the auxiliary display. With the recognition of a partial word in operation 1306, process 1300 may generate one or more suggested words which are considered to be likely to complete the partial word. In operation 1308 these suggested words are rendered on the auxiliary display in order to assist a user during typing.

In operation 1310, an input is received from a touch sensor. The touch sensor may be part of the auxiliary display, and may be operable to detect the presence and location of a touch on the surface of the auxiliary display. When operation 1308 has rendered a suggested word on the auxiliary display, in operation 1310 a user may select the word by touching a portion of the surface of the auxiliary display corresponding to the suggested word.

In operation 1311, a word is rendered on the main display. When operation 1308 has rendered a suggested word on the auxiliary display, and in operation 1310 an input from a touch sensor has been received indicating the selection of the suggested word, in operation 1311 the word may be rendered on the main display. For example, where the main display includes a rich graphical user interface such as an operating desktop with an application window (e.g., a document), the selected word may be inserted or substituted into an appropriate portion of the document and rendered on the main display.

Similarly, in operation 1312, a word is rendered on the auxiliary display. Operation 1312 may be executed substantially concurrently with operation 1311, and the word rendered on both the auxiliary display and the main display may be the same. In some examples, the auxiliary display may consist of a simplified graphical interface with a series of characters representing the most recently received inputs. When the input is received in operation 1310 corresponding to the selection of a suggested word rendered in operation 1308, the suggested word may be added to the series of characters in the auxiliary display.

The operations of process 1300 may be executed in other contexts, as illustrated in examples in FIGS. 1-10C. The process 1300 may be extended to situations with various information being rendered on the main display and the auxiliary display. The operations of process 1300 are merely illustrative in nature and not intended to be limiting.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic computing device, comprising:
   an enclosure comprising:
     an upper portion; and
     a lower portion pivotally coupled to the upper portion;
   a main display positioned within the upper portion;
   a set of keys positioned at least partially within the lower portion;
   a trackpad positioned within the lower portion;
   an auxiliary display positioned within the lower portion; and
   a processing unit operably coupled to the main display and the auxiliary display, the processing unit being configured to cause a first graphical element to be displayed on the main display and to cause a second graphical element comprising information to be displayed on the auxiliary display;
   wherein the first graphical element comprises a series of characters and the second graphical element comprises a subset of the series of characters.

2. The electronic computing device of claim 1, wherein:
   the first graphical element comprises text; and
   the second graphical element comprises a portion of the text in the first graphical element.

3. The electronic computing device of claim 1, wherein:
   the processing unit is further configured to determine an area of interest within the first graphical element; and
   the second graphical element includes the subset of the first graphical element that corresponds to the area of interest.

4. The electronic computing device of claim 1, wherein the auxiliary display further comprises a touch sensor configured to detect a location of a touch on a surface of the auxiliary display.

5. The electronic computing device of claim 4, wherein:
   the second graphical element further comprises:
     a suggested word generated at least in part in response to the series of characters; and
   in response to the location of the touch corresponding to the suggested word, the processing unit is configured to cause an inserted word to be inserted into both the series of characters of the first graphical element and subset of series of characters of the second graphical element.

6. The electronic computing device of claim 4, wherein the auxiliary display further comprises a force sensor configured to detect a force applied to the surface of the auxiliary display that exceeds a threshold.

7. The electronic computing device of claim 6, wherein:
   the second graphical element further comprises:
     one or more suggested words generated at least in part in response to the series of characters; and
   in response to the detected force, the processing unit is configured to cause the second graphical element to further comprise a user-selectable item.

8. The electronic computing device of claim 6, wherein the auxiliary display further comprises a haptic element configured to provide haptic feedback along the surface of the auxiliary display in response to the detected touch or the detected force.

9. The electronic computing device of claim 1, wherein the second graphical element comprises a visually scaled version of the first graphical element.

10. A method for rendering contextual information on an auxiliary display, comprising:
    rendering primary visual information on a main display, the primary visual information comprising typed characters;
    rendering secondary visual information on the auxiliary display positioned within a keyboard and operably coupled to the main display, the secondary visual information including a subset of the typed characters;
    receiving input from an input device, the input comprising an additional portion of information; and
    in response to the input from the input device, updating the primary visual information and the secondary visual information to each include the additional portion of information, the additional portion of information being associated with the input.

11. The method of claim 10, further comprising:
    causing the secondary visual information to include a user-selectable item;
    receiving additional input from a touch sensor in the auxiliary display, the touch sensor corresponding to the user-selectable item; and
    updating the primary visual information and the secondary visual information to include text or a graphical element corresponding to the user-selectable item.

12. The method of claim 11, further comprising:
    causing a haptic element to provide haptic feedback along a surface of the auxiliary display in response to the receiving additional input from the touch sensor.

13. The method of claim 10, further comprising:
    receiving additional input from a force sensor in the auxiliary display configured to detect an amount of force applied to a surface of the auxiliary display;

in response to the receiving additional input from the force sensor, causing the secondary visual information to include text or a graphical element representing optional actions; and executing the optional actions in response to a touch on the auxiliary display.

14. The method of claim 10, wherein the secondary visual information includes one or more suggested words; and further comprising:

receiving additional input from a touch sensor in the auxiliary display configured to detect a location of a touch on a surface of the auxiliary display; and in response to the receiving additional input from the touch sensor, substituting one of the one or more suggested words into the primary visual information and the secondary visual information.

15. The method of claim 10, wherein the primary visual information includes a graphical user interface and the secondary visual information includes a simplified portion of the graphical user interface.

16. An electronic computing device, comprising:

an upper portion, comprising:
   an enclosure; and
   a main display positioned at least partially within the enclosure;

a lower portion, comprising:
   an upper surface;
   a set of mechanical keys positioned within the upper surface; and
   an auxiliary display positioned in the upper surface between the set of mechanical keys and the upper portion; and a processing unit configured to receive inputs from the set of mechanical keys; wherein:
   based on the inputs from the set of mechanical keys, the processing unit causes primary visual information to be rendered on the main display; and
   based on the inputs from the set of mechanical keys, the processing unit causes secondary visual information to be rendered on the auxiliary display;

wherein the primary visual information comprises the inputs from the set of mechanical keys, and the secondary visual information comprises the most recent inputs from the set of mechanical keys.

17. The electronic computing device of claim 16, wherein the primary visual information comprises an application window and the secondary visual information comprises an area of interest within the application window.

18. The electronic computing device of claim 17, further comprising a sensor configured to detect user activity, wherein the processing unit is further configured to determine the area of interest within the primary visual information based on detected user activity and cause the secondary visual information to include the area of interest.

19. The electronic computing device of claim 16, wherein:

the primary visual information includes a user interface for a software application;

the secondary visual information includes a list of selectable items that corresponds to a user interface for the software application; and in response to a selection of an item of the list of selectable items, the processing unit executes an action corresponding to the item.

20. The electronic computing device of claim 16, wherein the secondary visual information comprises a visually scaled version of the primary visual information.

21. The electronic computing device of claim 16, wherein the primary visual information includes a graphical element and the secondary visual information includes a subset of the graphical element of the primary visual information.

* * * * *